United States Patent
Boschi et al.

(10) Patent No.: US 11,360,846 B2
(45) Date of Patent: Jun. 14, 2022

(54) TWO DIE SYSTEM ON CHIP (SOC) FOR PROVIDING HARDWARE FAULT TOLERANCE (HFT) FOR A PAIRED SOC

(71) Applicant: Intel Corporation, Santa Clara, CA (US)

(72) Inventors: Gabriele Boschi, S. Leonardo in Trep (IT); Roger May, Banbury (GB); Gabriele Paoloni, Pisa (IT); Nabajit Deka, Bangalore (IN); Matteo Salardi, Pisa (IT)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 16/585,104

(22) Filed: Sep. 27, 2019

(65) Prior Publication Data

US 2020/0026598 A1 Jan. 23, 2020

(51) Int. Cl.
*G06F 11/20* (2006.01)
*G06F 11/07* (2006.01)
*G06F 11/18* (2006.01)
*G06F 11/16* (2006.01)

(52) U.S. Cl.
CPC ........ *G06F 11/0796* (2013.01); *G06F 11/181* (2013.01); *G06F 11/201* (2013.01); *G06F 11/1641* (2013.01)

(58) Field of Classification Search
CPC ............. G06F 11/1629; G06F 11/1633; G06F 11/1637; G06F 11/1641; G06F 11/165; G06F 11/18; G06F 11/181; G06F 11/183; G06F 11/184; G06F 11/185; G06F 11/186; G06F 11/187; G06F 11/0796
See application file for complete search history.

(56) References Cited

U.S. PATENT DOCUMENTS 4,270,168 A * 5/1981 Murphy ............... G05D 1/0077
714/10
5,550,736 A * 8/1996 Hay ........................ G05B 9/03
244/76 R (Continued)

FOREIGN PATENT DOCUMENTS

DE 102020121003 A1 4/2021

*Primary Examiner* — Joseph O Schell
(74) *Attorney, Agent, or Firm* — Schwegman Lundberg & Woessner, P.A.

(57) ABSTRACT

Apparatuses of systems that provide Safety Integration Levels (SILs) and Hardware Fault Tolerance (HFT) include a first die, the first die including first processing logic connected to a first connection and the first connection connected to second processing logic of a second die. The first die may further include a second connection to an input/output (I/O) channel where the second connection is coupled to the first processing logic. The apparatuses may further include a second die, the second die including second processing logic and a third connection from a secondary device coupled to the second processing logic. The secondary device is outside the system. The second processing logic is configured to select among three configurations based on signals from the second processing logic and the secondary device: sending first output data on the I/O output channel, sending second output data on the I/O output channel, or de-energizing the I/O channel.

25 Claims, 21 Drawing Sheets

(56) References Cited

U.S. PATENT DOCUMENTS

| | | | | |
|---|---|---|---|---|
| 5,915,082 | A * | 6/1999 | Marshall | G06F 11/1641 |
| | | | | 714/11 |
| 6,615,366 | B1 * | 9/2003 | Grochowski | G06F 9/30076 |
| | | | | 712/1 |
| 7,047,440 | B1 * | 5/2006 | Freydel | G05B 19/0428 |
| | | | | 714/10 |
| 2007/0033511 | A1 * | 2/2007 | Davies | G06F 11/181 |
| | | | | 714/799 |
| 2010/0049268 | A1 * | 2/2010 | Martins | G06F 11/2035 |
| | | | | 607/9 |
| 2013/0159779 | A1 * | 6/2013 | Mickens | G06F 11/362 |
| | | | | 714/38.14 |
| 2016/0274960 | A1 * | 9/2016 | Inoue | G06F 11/0787 |
| 2018/0018208 | A1 * | 1/2018 | Zettler | G06F 11/0751 |
| 2018/0267866 | A1 * | 9/2018 | Venu | G06F 11/1658 |

* cited by examiner

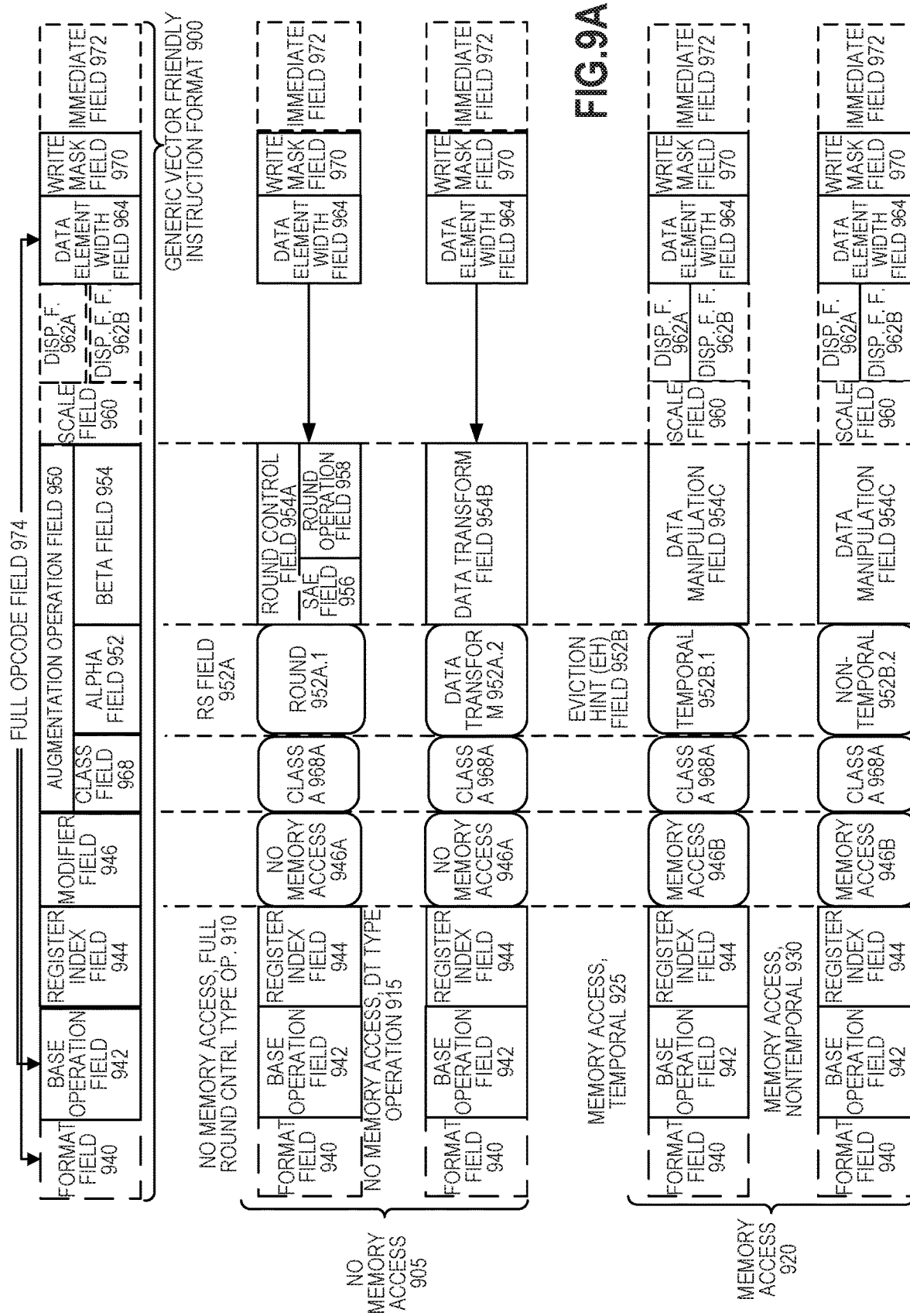

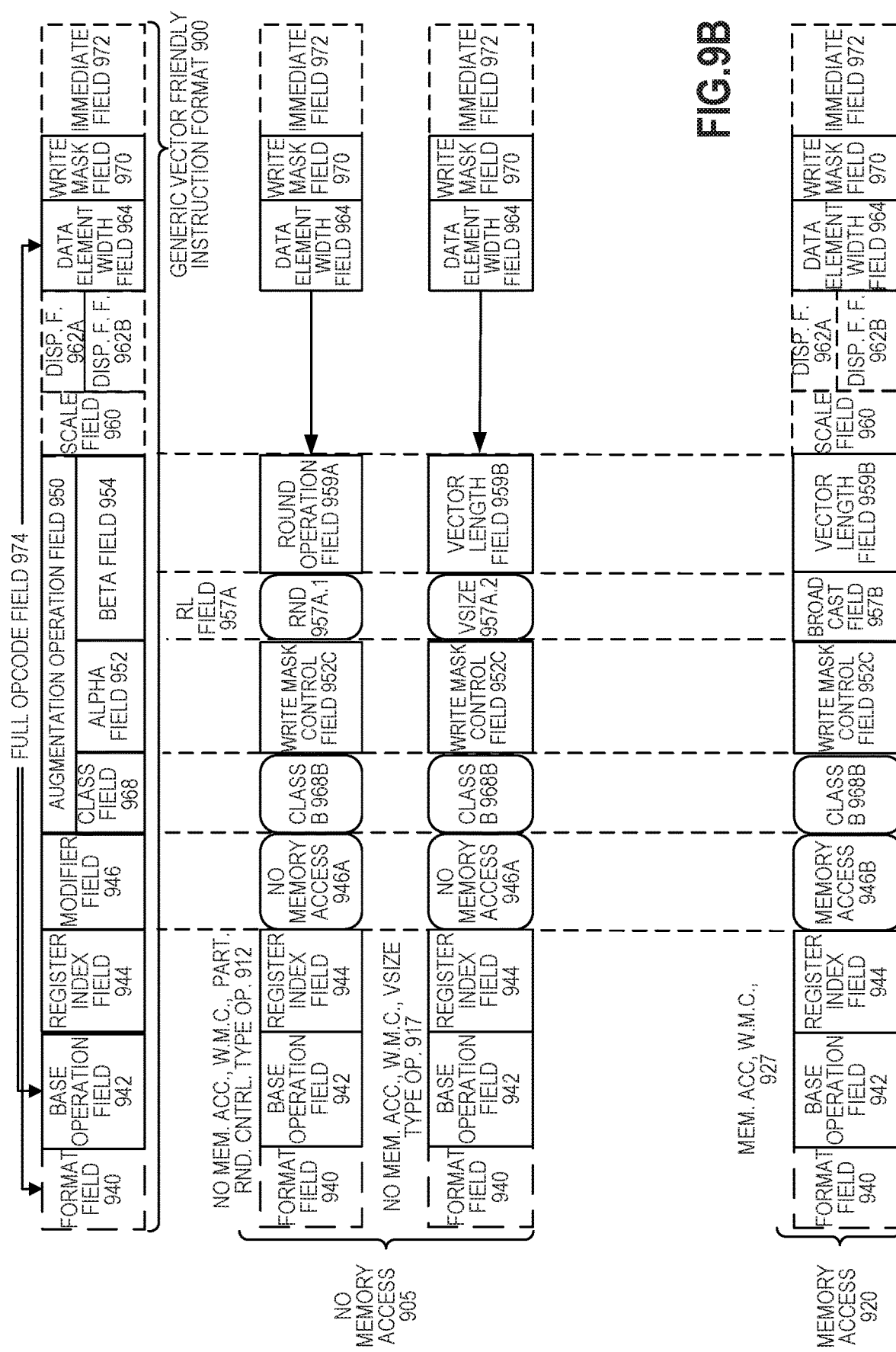

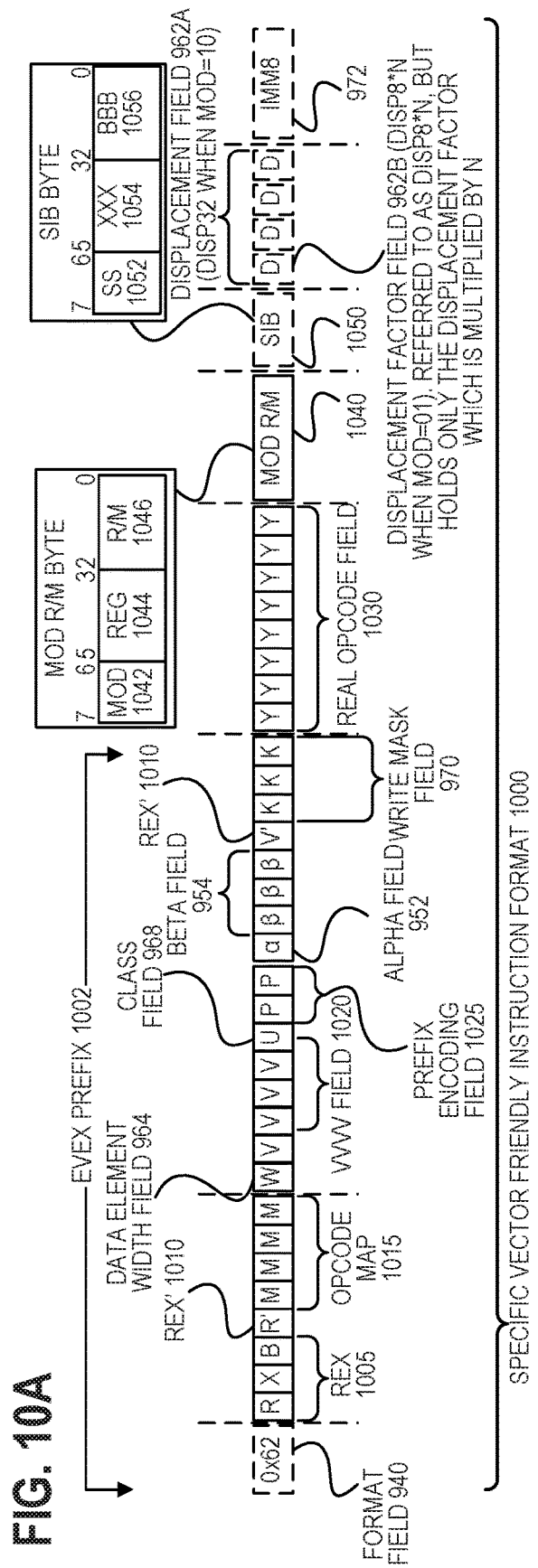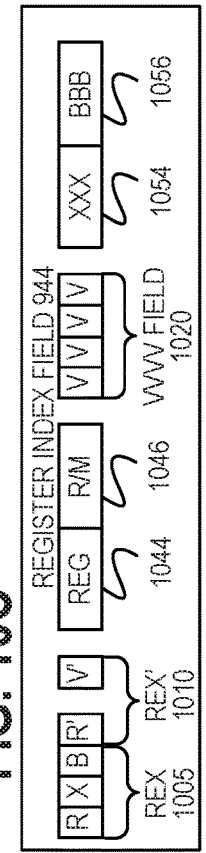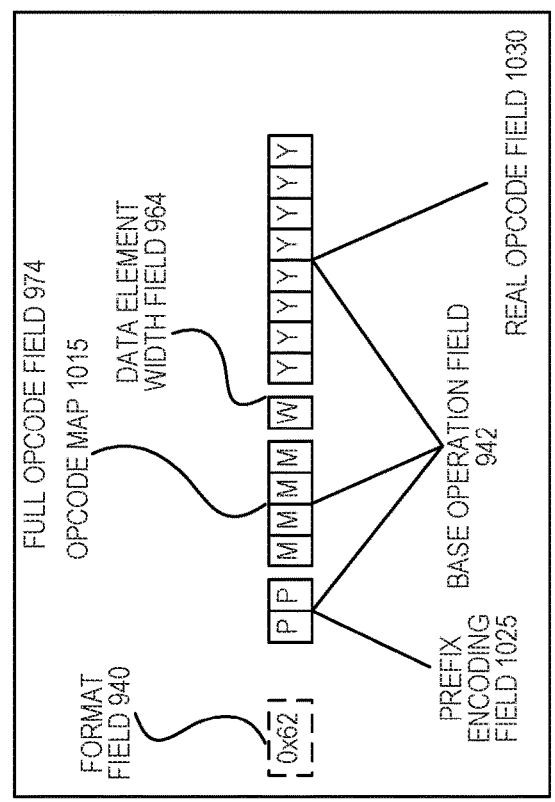
FIG. 10A
FIG. 10B
FIG. 10C

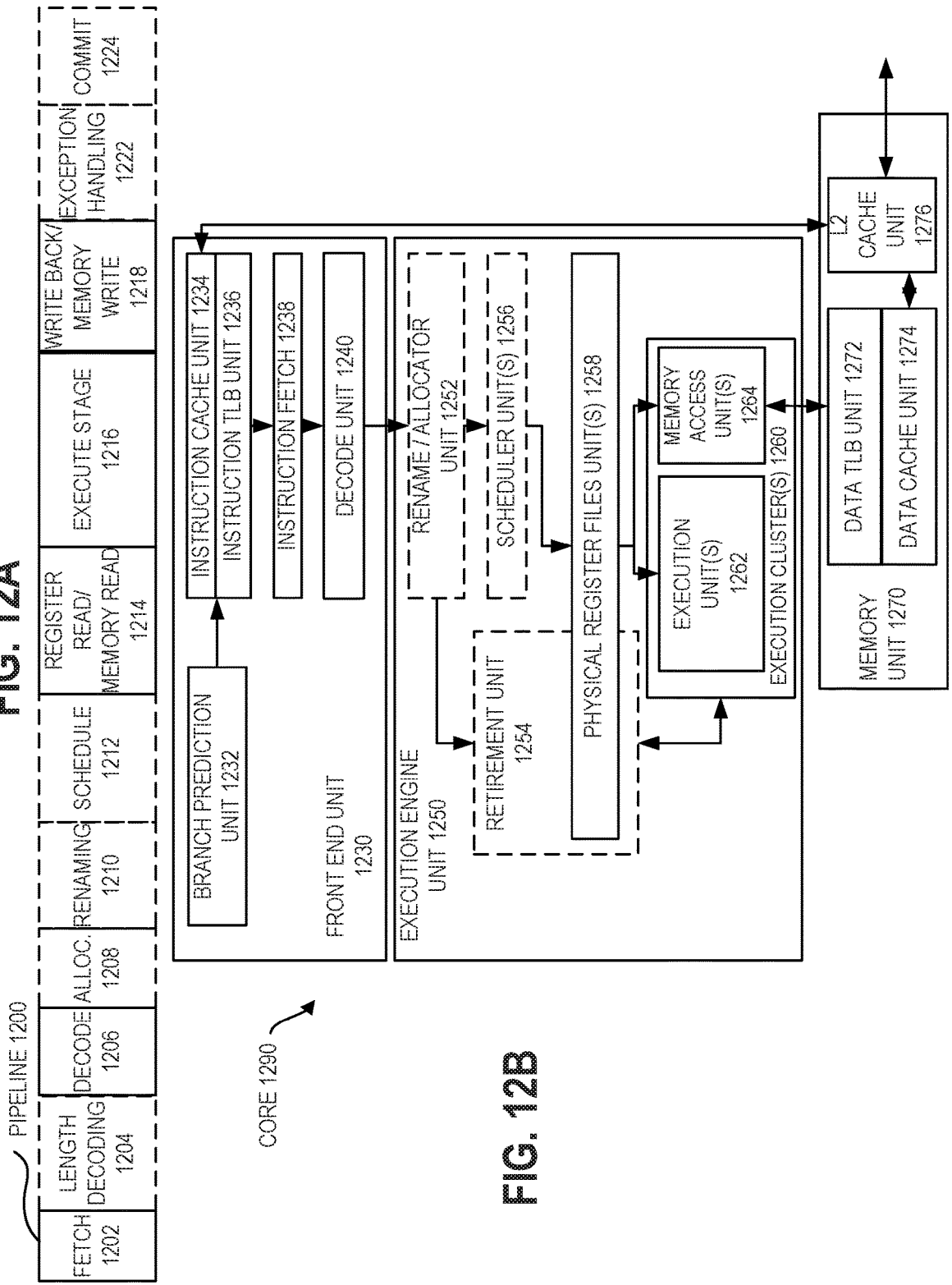

US 11,360,846 B2

TWO DIE SYSTEM ON CHIP (SOC) FOR PROVIDING HARDWARE FAULT TOLERANCE (HFT) FOR A PAIRED SOC

TECHNICAL FIELD

Embodiments relate to two die Systems on a Chip (SoC) for functional safety applications. Some embodiments relate to a SoC with multiple dies that provide Safety Integration Levels (SILs), Hardware Fault Tolerance (HFT), and/or functional safety (FuSa) for external applications implemented on a paired SoC.

BACKGROUND

Many applications require a SIL and HFT. For example, some applications require that 90% of the time they will safely fail if there is a system error. The developer would like to reduce the cost and complexity required to provide an application with a SIL and HFT. It may be time consuming and require additional hardware for the developer of an application to provide a SIL and HFT. Additionally, providing a SIL and HFT may require additional skills beyond implementing the application.

BRIEF DESCRIPTION OF THE DRAWINGS

The present disclosure is illustrated by way of example and not limitation in the figures of the accompanying drawings, in which like references indicate similar elements and in which:

FIGS. 9A-9B are block diagrams illustrating a generic vector friendly instruction format and instruction templates thereof according to an embodiment;

FIGS. 10A-10D are block diagrams illustrating a specific vector friendly instruction format according to an embodiment;

FIG. 12A is a block diagram illustrating both an in-order pipeline and a register renaming, out-of-order issue/execution pipeline according to an embodiment;

FIG. 12B is a block diagram illustrating both an in-order architecture core and a register renaming, out-of-order issue/execution architecture core to be included in a processor according to an embodiment;

DESCRIPTION

Figure 1:
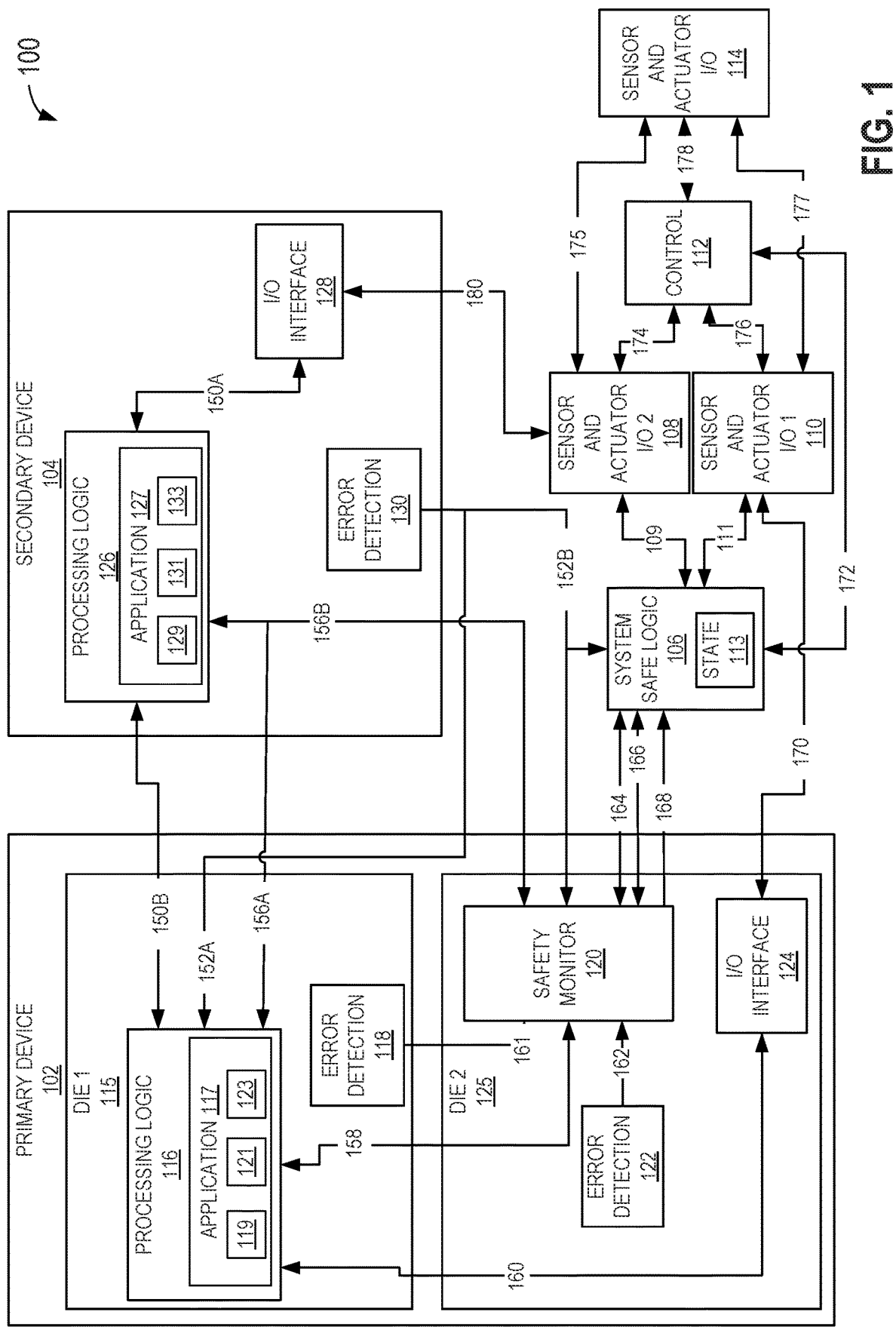
FIG. 1 illustrates system with a two-die architecture, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Systems, computer readable media, and methods are provided for a two-die SoC that provides SILs and/or HFT. In some embodiments, a SoC is an integrated circuit (IC) that integrates many or all components of a computer or electronic system on a single chip. Some embodiments include two channels implemented on different SoCs (e.g., the same application may be implemented on two different chips) where one of the SoC provides diagnostics and switching logic to switch channels if there is a faulty channel. Some embodiments include de-energizing an input/output (I/O) channel (e.g., sensor input and actuator output) and/or stopping communication to actuators if faults indicate the output from either of two channels is faulty. Some embodiments include de-energizing an I/O channel and/or stopping communication to actuators if faults indicate that output from both channels is faulty.

A two-die SoC, e.g., a primary device, provides FuSa where a second die of the primary device includes an integrated safety monitor with cross comparison capability that provides safety collateral such as firmware (FW)/software (SW) and hardware (HW) interfaces for a secondary SoC, e.g., secondary device, to mate or pair with the primary device, and a first die of the primary device runs an application that is duplicated on the secondary device.

A technical problem is how to provide a SIL for an application that reduces the complexity that is needed to implement the SIL for the application. Some embodiments enable support for a SIL on a SoC with two dies, e.g., a primary device, that is mated with a secondary device, e.g., a secondary SoC. In some embodiments, a two-die SoC enables system integrators to more easily implement an HFT>0 system to meet higher SIL standards by coupling a secondary device to a primary device.

The application is executed or run by the primary device and separately, e.g., duplicated, on the secondary device, e.g., a developer's SoC. The primary device provides the functionality, e.g., hardware and software/firmware, to implement the SIL, and/or HFT. A platform integrator does not need to implement the SIL, and/or HFT separately, but rather attaches the SoC that runs the application to the primary device. The primary device provides loo2 or loo2D for the application, in accordance with some embodiments.

The primary device, e.g., two-die SoC, integrates with the secondary device, another SoC, to meet loo2 and loo2D application standards. For loo2, the secondary device, e.g., SoC, can be non FuSa certified and an off the shelf part, in accordance with some embodiments.

The primary device is compliant (or certified) with International Electrotechnical Commission (IEC) 61508 and/or ISO26262 automotive, in accordance with some embodiments. The application, e.g., a safety application, executes on both the primary device, e.g., one of the dies of a two-die SoC, and a secondary device, e.g., another SoC. In some embodiments, higher performance secondary devices can be used to execute other applications while still providing a SIL for the safety application. A diverse implementation of two channels, e.g., the application running on both the primary device and the secondary device, reduces dependency on systematic fault avoidance and control requirements, in accordance with some embodiments.

Some embodiments include using a separate Master Control Unit (MCU) and two SoCs that each run a copy of the application. A customized solution is developed for the application for cross monitoring the output and errors from the two SoC to provide a SIL and HFT, e.g., IEC 61508. The embodiments with the separate MCU often require external voting by the MCU and monitoring logic as well as customized software. Some embodiments relate to a two die SoC architecture with integrated safety monitor IP and other inbuilt safety features that allows easier integration with another SoC to achieve hardware fault tolerant. Some embodiments generally relate to functional safety applications. Some embodiments relate to higher safety integrity level applications that require HFT>0 using multiple redundant processing channels.

In some embodiments, compliance with higher functional safety requirements may be difficult, e.g., SIL>=3 as per IEC61508 standards. To meet IEC 61508 standards, platforms often include two separate (e.g., redundant) processing channels, with each processing channel residing on an independent device (e.g., system on chip/SoC). System integration of an architecture with cross-monitoring often includes hardware and software customized for the cross-monitoring solution, which may be costly due to development and certification complexity. Additionally, customized hardware often includes a relatively high component count (e.g., bill of materials/BOM) and customized solutions often become obsolete because of changes to SoC technology and functional safety standard changes. In some embodiments, safety and non-safety functions co-exist which often makes it difficult for original equipment manufacturers (OEMs) to determine the processing requirements.

FIG. 1 illustrates system 100 with a two-die architecture, in accordance with some embodiments. Illustrated in FIG. 1 is primary device 102, secondary device 104, system safe logic 106, sensor and actuator input/output (I/O) 2 108, sensor and actuator I/O 1 110, control 112, sensor and actuator I/O 114, and connections 150 through 180. Die 1 115 and secondary device 104 implement an application 117, 227, respectively and die 2 125 monitors the activity to provide a SIL and HFT, in accordance with some embodiments. Die 1 115 and secondary device 104 implement an application 117, 127, respectively and die 2 125 monitors the activity to provide cross comparison and diagnostics to meet SIL specifications, in accordance with some embodiments. The application 117, 127 may be implemented in hardware, software, and/or firmware. The application 117, 127 may be implemented partially outside die 1 115 or secondary device 104. The processing logic may need additional components outside the die to execute the application. For example, each SoC may need external DRAM. For example, DRAM 212 (of FIG. 2) may include portions of the implementation of application 117, 127. Application 127 duplicates the functionality of application 117 for redundancy or to implement HFT=1.

Application 117, 127 takes input 119, 129, from sensor and actuator I/O 114 and processes the input 119, 129 to generate output 121, 131 (e.g., via sensor and actuator I/O 1 110 and sensor and actuator I/O 2 108, respectively). Application 117, 127 may be separate applications. Applications 117 and 127 may be diversely implemented, in accordance with some embodiments. Application 117, 127 generate cross-comparison data 123, 133, respectively.

The primary device 102 includes die 1 115 and die 2 125. Die 1 115 includes processing logic 116 and errors 118. Die 2 125 includes safety monitor 120, errors 122, and I/O interface 124. Secondary device 104 includes processing logic 126, I/O interface 128, and errors 130. Die 1 115 and die 2 125 are blocks of semiconducting material on which the functional circuit is fabricated, e.g., on which processing logic 116, errors 118, safety monitor 120, errors 122, and I/O interface 124 is fabricated. Primary device 102 may be a silicon chip on which die 1 115 and die 2 125 are fabricated. Primary device 102 may be a package that integrates die 1 115 and die 2 125. The primary device 102 may include more than two dies. The secondary device 104 is a system on a chip (SoC). The secondary device 104 may include multiple dies. The secondary device 104 may be a system on a board.

Die 1 115, die 2 125, and secondary device 104 have separate clocks (e.g., referring to FIG. 2, clock 208 and/or independent clock source 222), in accordance with some embodiments. Die 1 115, die 2 125, and secondary device 104 have separate power source (e.g., power 204, and/or external VR/PMIC 206), in accordance with some embodiments. Die 1 115, die 2 125, and secondary device 104 may each include additional interfaces and components, e.g., as disclosed in conjunction with FIG. 2.

Figure 2:
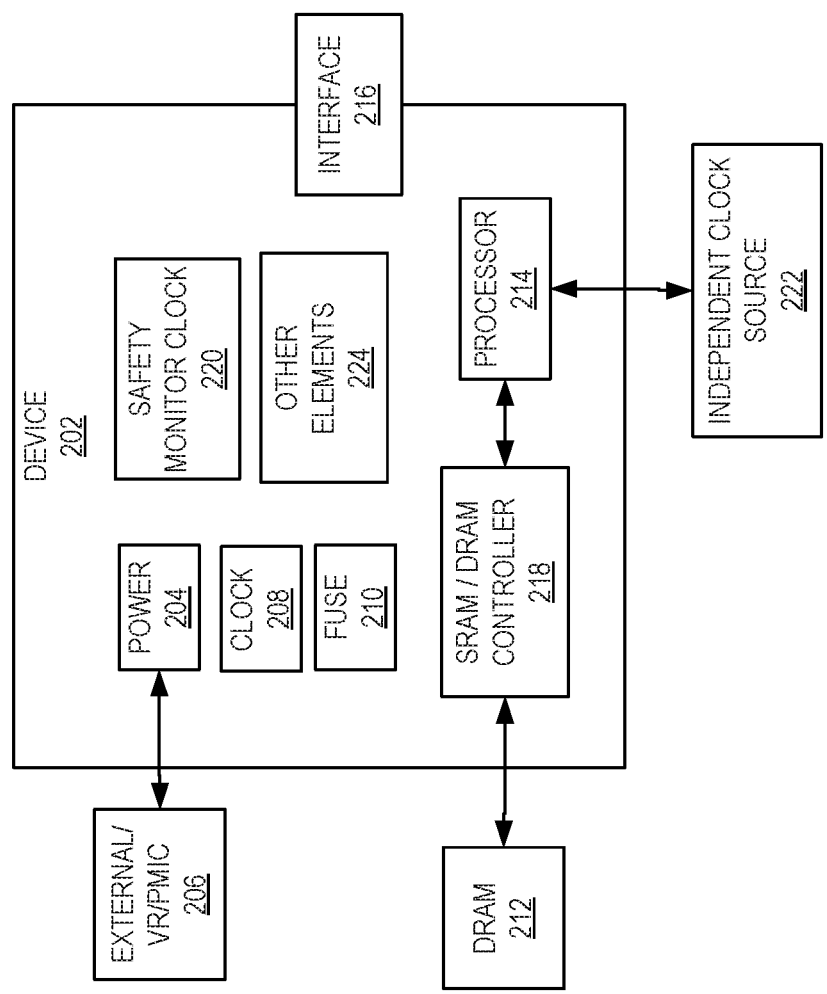
FIG. 2 illustrates device, in accordance with some embodiments.

FIG. 2 is disclosed in conjunction with FIG. 1. FIG. 2 illustrates device 202, in accordance with some embodiments. Device 202 may be a silicon chip or a portion of a silicon chip, in accordance with some embodiments. Device 202 may be a board. Device 202 includes one or more of the following: power 204, external voltage regulator (VR)/power management integrated circuit (PMIC) 206 clock 208, fuse 210, separate dynamic random access memory (RAM) (DRAM) 212, processor 214, interface 216, static RAM (SRAM)/DRAM controller 218, safety monitor clock 220, independent clock source 222, and other elements 224. The power 204 may be a power source that provides power for the device 202. The VR/PMIC 206 provides power and power reset signals. Clock 208 may be a clock that is part of the silicon chip. Fuse 210 may be one or more fuses. DRAM 212 may be external memory. The processor 214 may be the safety monitor 120, processing logic 116, 126, or another portion of a silicon chip that performs functions.

Interface 216 may be one or more interfaces between the device 202 and elements of the device 202, e.g., an interface for I/O interface 124, 180, errors 118, 130, safety monitor 120, and/or processing logic 116, 126.

SRAM/DRAM controller 218 provides memory that may be part of the device 202. Independent clock source 222 is a clock source that is independent of at least one other clock used by the system 100. Other elements 224 may include one or more additional elements that are part of the device 202 or that interface to the device 202, etc. Primary device 102, die 1 115, die 2 125, and/or secondary device 104 may be device 202, in accordance with some embodiments.

Returning to FIG. 1, processing logic 116, processing logic 126, and safety monitor 120 are central processing unit (CPU) cores or another type of processing logic (e.g., see FIGS. 9-18), in accordance with some embodiments. Errors 118, 130, and 122 monitor the die 1 115, secondary device 104, and die 2 125, respectively, for errors. Such detected errors may be software, firmware, or hardware errors. Errors 118, 130, 122 are implemented in hardware, firmware, and/or software. Errors may be detected based on checks with the hardware, firmware, and/or software such as error correction codes (ECC), parity, CRC, built-in selftest (BIST), etc.

Error detection 118 signals errors via connection 161 to safety monitor 120. Error detection 122 signals errors via connection 162 to safety monitor 120. Error detection 130 signals errors to safety monitor 120 via 152B and/or to processing logic 116 via connection 152A. In some embodiments, error detection 130 signals errors to safety monitor 120 via 152B and there is not a connection 152A. In some embodiments, error detection 130 signals errors to processing logic 116 and there is not a connection 152B. When error detection 130 signals errors to processing logic 116, processing logic 116 signals the errors to the safety monitor 120 via connection 158, in accordance with some embodiments. Error detection 118, 130, and/or 122 may use different connections and/or pathways to signal errors to safety monitor 120, in accordance with some embodiments.

I/O interface 124 and I/O interface 128 are interfaces for sensor and actuator I/O 1 110 and sensor and actuator I/O 2 108, respectively. I/O interface 124 receives/sends I/O data from/to processing logic 116 via connection 160. I/O interface 128 receives/sends I/O data from/to processing logic 126 via connection 150A. Processing logic 126 receives input data from processing logic 116 and sends output data to processing logic 116 via connection 150B, in accordance with some embodiments. When processing logic 116 receives input data from I/O interface 124 via connection 160, processing logic 116 sends input data to processing logic 126 via connection 150B, in accordance with some embodiments.

When processing logic 116 receives output data from processing logic 126 via connection 150B, processing logic 116 sends output data to I/O interface 124. In some embodiments, processing logic 126 communicates I/O data via connection 150A with I/O interface 128 and does not use connection 150B for I/O data. In some embodiments, there is no connection 150B for communicating I/O data. In some embodiments, processing logic 126 communicates I/O data via connection 150B and does not use connection 150A for I/O data. In some embodiments, there is no connection 150A for communicating I/O data.

In some embodiments, I/O interface 128 communicates input data 129 and output data 131 to sensor and actuator I/O 114. The input data 129 and output data 131 may be communicated via sensor and actuator I/O 2 108 and control 112. The sensor and actuator I/O 2 108 and sensor and actuator I/O 1 110 may be connections or may be connections that includes buffers and/or protocol support. The control 112 may control whether output data 121, 131 from sensor and actuator I/O 1 110 via connection 174 or output data from sensor and actuator I/O 2 108 via connection 176 is selected for output data for sensor and actuator I/O 114 via connection 178. In some embodiments, control 112 determines to de-energize the output via connection 178 and/or to stop communication to actuators. Input data 119, 129 is received from sensor and actuator I/O 114 via connection 178 by control 112. Control 112 sends the input data 119, 129 to sensor and actuator I/O 1 110 and sensor and actuator I/O 2 108. In some embodiments, control 112 may not send the input data 119, 129 to one or both of sensor and actuator I/O 1 110 or sensor and actuator I/O 2 108. System safe logic 106 may include a state 113. The state 113 may be the result of logic, e.g., Table 1. The state 113 may be persistent, e.g., to de-energize connection 178 due to errors and/or to stop communication to actuators.

In some embodiments, control 112 is part of die 2 125. For example, I/O interface 124 may be connected to sensor and actuator I/O 114 and I/O data from processing logic 116 and from processing logic 126 may be connected to control 112. As an example, processing logic 126 may send output data 131 to processing logic 116 via connection 150B, and processing logic 116 may send output data 131 from processing logic 126 and output data 121 to control 112 via connection 160. Connection 160 may feed into control 112 with the output of control 112 going into I/O interface 124. There may be multiple controls. For example, there may be a control 112 so that safety monitor can de-energize connection 160 and/or stop communication to actuators on connection 160. In some embodiments, control 112 may not be present, e.g., sensor and actuator I/O 2 108 may have a connection 175 to sensor and actuator I/O 114 and sensor and actuator I/O 1 110 may have a connection 177 to sensor and actuator I/O 114.

Figure 3:
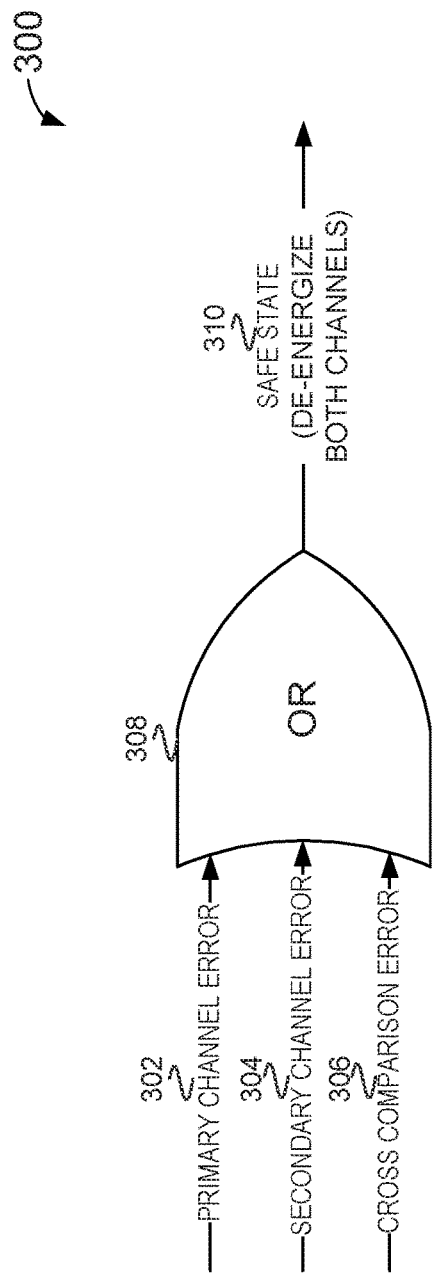
FIG. 3 illustrates loo2 system safe state logic, in accordance with some embodiments.

FIG. 3 is disclosed in conjunction with FIG. 1. FIG. 3 illustrates 1oo2 system safe state logic 300, in accordance with some embodiments. Illustrated in FIG. 3 is primary channel error 302, secondary channel error 304, cross comparison error 306, OR 308, and safe state 310. Primary channel error 302 is a signal indicating an error on the primary channel. For example, error detection 118 (FIG. 1) indicates errors on the primary channel. Secondary channel error 304 is a signal indicating an error on the secondary channel. For example, error detection 130 is a signal indicating an error on the secondary channel, which may be sent to the processing logic 116 and/or safety monitor 120. Cross comparison errors 306 is based on a comparison of cross comparison data 123 sent by the processor of the primary channel and cross comparison data 133 sent by the processor of the secondary channel. For example, processing logic 116 (processor of primary channel) may send cross comparison data 123 via connection 158 to safety monitor 120. Processing logic 126 (processor of secondary channel) may send cross comparison data 133 via connection 156B to safety monitor 120 and/or to processing logic 116 via connection 156A (and then processing logic 116 sends cross comparison data 133 to safety monitor 120 via connection 158). In some embodiments, processing logic 116 is configured to compare cross-comparison data 123 with cross-comparison data 133, and to indicate an error to the safety monitor 120 if the do not match.

Cross-comparison data 123, 133 is data that is generated by processing logic 116, 126, respectively. For example, processing logic 116, 126 may receive input data 119, 129 from sensor and actuator I/O 114 and generate a cycle redundancy code (CRC) from the input data 119, 129. The cross-comparison data may be the CRC. The cross-comparison data 123, 133 may include data that is based on the input data 119, 129, and the output data 121, 131. The cross-comparison may include multiple CRCs and/or other data that may be used to determine whether the input data 119, 129 received by processing logic 116 and processing logic 126 is the same. Additionally, the cross-comparison data 123, 133 may include data that may be used to determine whether the output data 121, 131 from processing logic 116 and processing logic 126, respectively is the same or likely the same. Again, CRCs may be determined as well as other data. The cross-comparison data 123, 133 may be a form of compression of the output data to facilitate comparing the output data 121 of application 117 (processing logic 116) with the output data 131 of application 127 (processing logic 126).

OR 308 may indicate 'or' logic that is implemented in hardware, software, or firmware. OR 308 may be implemented on a board (not illustrated) that hosts primary device 102 and secondary device 104, e.g., control 112 may implement the OR 308. OR 308 may be implemented by safety monitor 120 that controls a switch (e.g., when control 112 is a switch) via connection 172. The OR 308 may be implemented by system safe logic 106, which may be part of safety monitor 120. For example, connection 164 and/or connection 152B indicate secondary channel error 304, connection 166 indicates primary channel error 302, and connection 168 indicates a cross-comparison data 123, 133 error 306, e.g., safety monitor 120 compares the cross-comparison data 123, 133 from application 117 and application 127 and determines that different output data is being generated by application 117 and application 127. System safe logic 106 may implement the OR 308 with input connections 164 (or 152B), 166, and 168, and the output connection 172 that de-energize the channel and/or stop communication to actuators via connection 178 if there is a primary channel error 302 (e.g., connection 166 indicates primary channel error 166), a secondary channel error 304 (e.g., connection 164 and/or connection 152B indicate secondary channel error 304), or a cross-comparison error 306 (e.g., connection 168 indicates a cross-comparison data error). In some embodiments, system safe logic 106 may de-energize connection 180 and/or connection 174 and/or stop communication to actuators via connection 109. In some embodiments, system safe logic 106 may de-energize connection 170 and/or connection 176 and/or stop communication to actuators via connection 111. In some embodiments, system safe logic 106 may de-energize connection 178 and/or stop communication to actuators via connections 109, 111 by de-energizing connections 170/176 and 180/174. Connections 170/176 and 180/174 include an input portion for input data 119,129 and an output portion for output data 121,131 so that system safe logic 106 may stop, e.g., de-energize, the output portion of the communication without stopping the input portion, in accordance with some embodiments. In some embodiments, safe state is achieved by stopping the communication to the actuators (160 and 150A). In some embodiments, control 112 is a switch and sensor and actuator I/O 1 110 and sensor and actuator I/O 2 108 are connections. In some embodiments, system safe logic 106 is not part of die 2 125. In some embodiments, system safe logic 106 is part of the safety monitor 120. In some embodiments, different logic operations may be performed by the system safe logic 106, e.g., connection 172 may be used to select the output data 121 of connection 176, the output data 133 of connection 174, or to de-energize connection 178 for no output data.

In some embodiments, the safety monitor 126 of die 2 110 of the primary device 106 implements diagnostic and cross monitoring functions that can replace the role of an external Master Control Unit (MCU). In some embodiments, MCU may refer to microprocessor control unit. The safety monitor 126 may control and monitor other hardware (HW) and software (SW) diagnostic measures of the primary device 106, in accordance with some embodiments. The safety monitor 120 may control and monitor other HW and SW diagnostic measures of the secondary device 104, in accordance with some embodiments. In some embodiments, safety monitor 120 may implement the logic of the OR 308 and control the state of the safe state 310 (e.g., connection 178) via connection 172.

In some embodiments, control 112 takes the input data 119, 129 from sensor and actuator I/O 114 and sends it to both connections 174, 176. In some embodiments, output data 131 from the secondary device 104 is not sent on connection 178. Only the output data from application 117 is sent on connection 178. The cross-comparison data (e.g., sent on connection 158B and/or 156A), error detection 118, and error detection 130, are used by the safety monitor 120 to determine the result of OR 308 (FIG. 3). The safety monitor 120 either selects for the output data from processing logic 116 to be sent on connection 178 or to de-energize connection 178, in accordance with some embodiments. In some embodiments, control 512 may not be present, e.g., sensor and actuator I/O 2 108 may have a connection 175 to sensor and actuator I/O 114 and sensor and actuator I/O 1 110 may have a connection 177 to sensor and actuator I/O 114.

In some embodiments, there is no connection 150B or connection 150A as the output data from application 127 is not used beyond determining the cross-comparison data 133. In some embodiments, safety monitor 120 will go into the de-energized state for connection 178 if error detection 122 are generated that indicate that die 2 125 has errors. In some embodiments, if an error of error detection 118 is signaled, then connection 160 is de-energized so that data output 121 is not sent. In some embodiments, if an error of error detection 130 is signaled, then connection 150A and/or 150B is de-energized so that data output 131 is not sent. A de-energized state for connection 178 may prevent the output data 121, 131 from being communicated to sensor and actuator I/O 114 while permitting input data 119, 129 from sensor and actuator I/O 114, in accordance with some embodiments.

Sensor and actuator I/O 114 may be sensors and actuators. For example, the sensors may be electronic devices that generate electronical or electronic signals that are sent to control 112. Example sensors include video cameras, microphones, motion detectors, sensors attached to machines that report machine positions, sensors attached to automobiles such as whether a door is shut or a temperature of the engine, etc. Actuators include actuators that adjust the operation of a machine, actuators that turn on or off electronic, electrical, or mechanical devices, actuators that turn on or off lights, actuators that operate an automobile, etc. In an example, the input sensor data may be input data from a motion detector or video camera attached to an automobile, and output actuator data may be data to control the movement of the automobile.

In some embodiments, die 1 115 and die 2 125 may be a same die, e.g., the processing logic 116 and safety monitor 120 may be on a same die. In some embodiments, the primary device 102 includes only one die that includes all the components of die 1 115 and die 2 125 of FIGS. 1 and/or 5.

Figure 4:
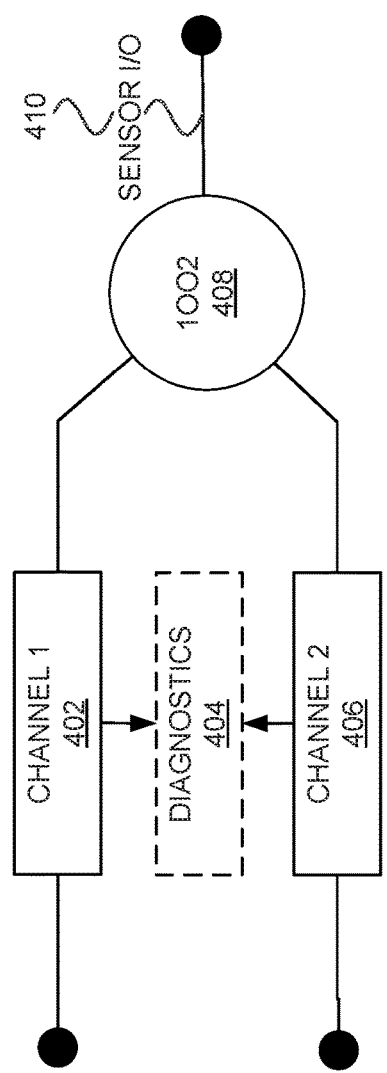
FIG. 4 is a loo2 architecture, in accordance with some embodiments.

FIG. 4 is a 1oo2 architecture 400, in accordance with some embodiments. Illustrated in FIG. 4 is channel 1 402, optional diagnostics 404, channel 2 406, 1oo2 408, and sensor I/O 410. 1oo2 architecture 400 may be configured to enter a safe state (e.g., de-energize sensor I/O 410) if there are any indications of faults. Channel 1 402 may be connection 176

(FIG. 1). Channel 2 406 may be connection 174 (FIG. 1). Channel 1 402 and channel 2 406 are channels for transmission of input and output data (e.g., input data 119, 129, output data 121, 131). Diagnostics 404 and loo2 408 may implement the loo2 system safe state logic 300 as disclosed in conjunction with FIG. 3, e.g., diagnostics 404 and loo2 408 may be system safe logic 106 and control 112 as disclosed in conjunction with FIGS. 1-3. loo2 architecture 400 is compliant with IEC 61508 in accordance with some embodiments.

Figure 5:
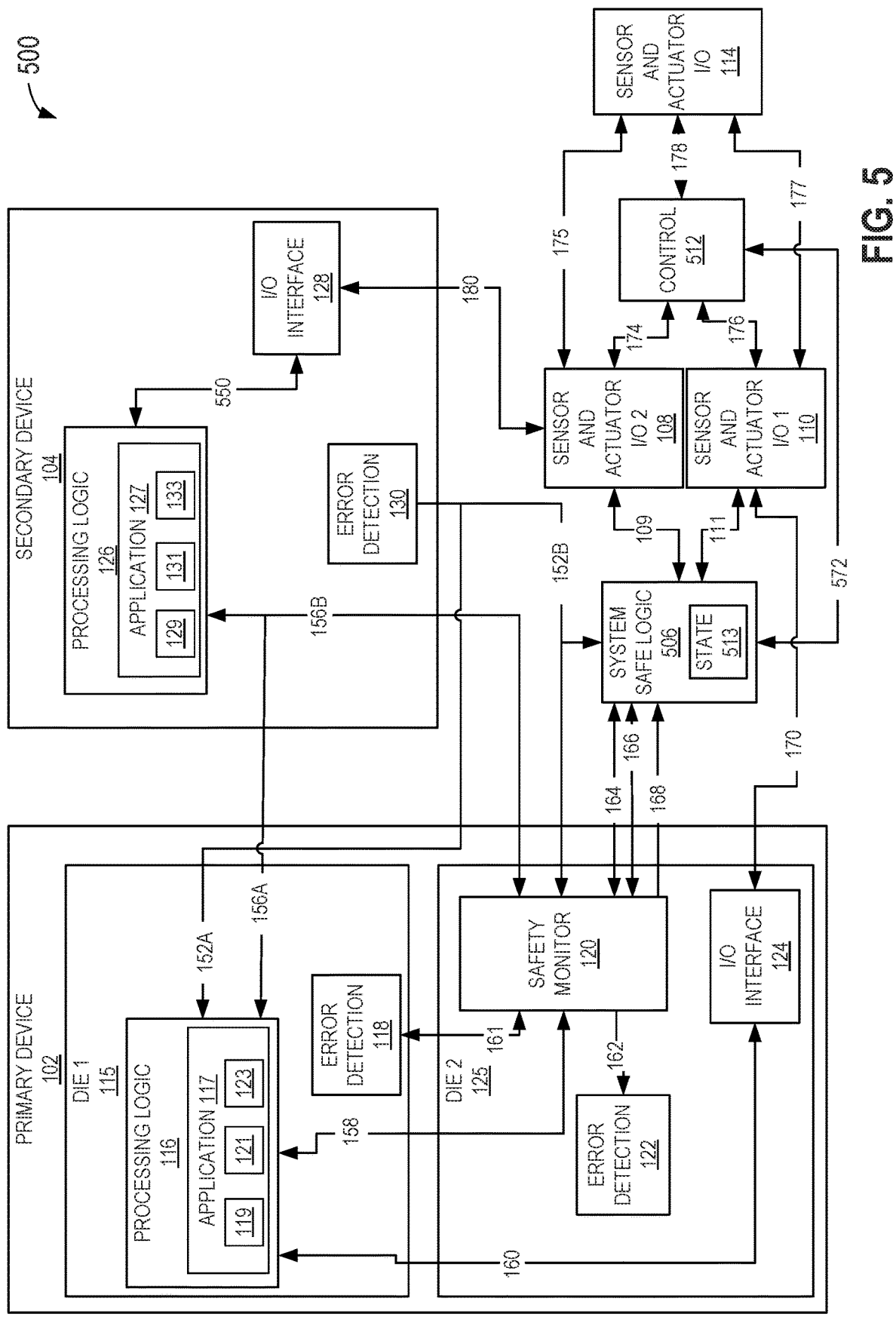
FIG. 5 illustrates system with a two-die architecture, in accordance with some embodiments.

FIG. 5 illustrates system 500 with a two-die architecture, in accordance with some embodiments. Illustrated in FIG. 5 is primary device 102, secondary device 104, system safe logic 506, sensor and actuator I/O 2 108, sensor and actuator I/O 1 110, control 512, sensor and actuator I/O 114, and connections 150 through 180 and connection 550. Primary device 102 may be the same or similar to primary device 102 as disclosed in conjunction with FIG. 1. Secondary device 104 may be the same or similar to secondary device 104 of FIG. 1. Sensory and actuator I/O 1 110 may be the same or similar as sensory and actuator I/O 1 110 as disclosed in conjunction with FIG. 1. Sensory and actuator I/O 2 108 may be the same or similar as sensory and actuator I/O 2 108 as disclosed in conjunction with FIG. 1. Sensory and actuator I/O 114 may be the same or similar as sensory and actuator I/O 114 as disclosed in conjunction with FIG. 1.

In FIG. 5, the output data 131 generated by the application 127 is sent via connection 550 to the I/O interface 128. In some embodiments, system safe logic 506 is not part of die 2 125. In some embodiments, system safe logic 506 is part of the safety monitor 120 and/or die 2 125. In some embodiments, control 512 is not part of die 2 125. In some embodiments, control 512 is part of the safety monitor 120 and/or die 2 125. In some embodiments, error detection 130 are signaled to the system safe logic 506 via connection 152B, but not to the safety monitor 120.

Figure 6:
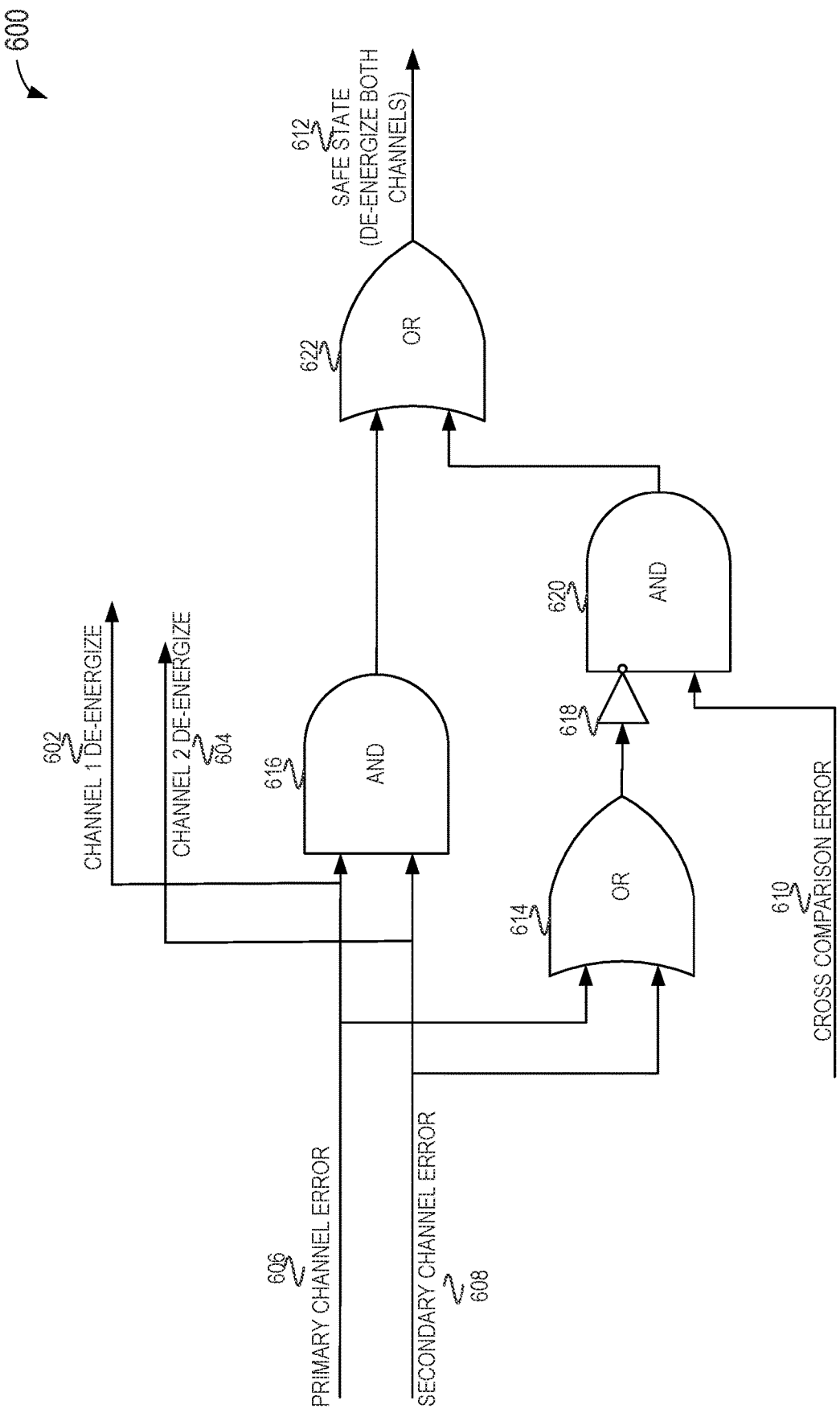
FIG. 6 illustrates loo2D system safe state logic, in accordance with some embodiments.

FIG. 6 is disclosed in conjunction with FIG. 5. FIG. 6 illustrates loo2D system safe state logic 600, in accordance with some embodiments. Illustrated in FIG. 6 is channel 1 de-energize 602, channel 2 de-energize 604, primary channel error 606, secondary channel error 608, cross comparison error 610, safe-state (de-energize both channels) 612, OR 614, AND 616, NOT 618, AND 620, and OR 622. In some embodiments, channel 1 de-energize 602, channel 2 de-energize, and/or safe state (de-energize both channels) 612 may prevent output data from being communicated to sensor and actuator I/O (e.g., sensor and actuator 114) while permitting input data from sensor and actuator I/O, in accordance with some embodiments. In some embodiments, safe state is achieved by stopping the communication to the actuators (160 and 150A)

Primary channel error 606 is a signal indicating an error on the primary channel. For example, error detection 118 (FIG. 5) indicates errors on the primary channel. Errors may be signaled via connection 161 from die 1 115 to die 2 125, e.g., to safety monitor 120. Errors may be signaled to the system safe logic 506 via connection 166, in accordance with some embodiments.

Secondary channel error 608 is a signal indicating an error on the secondary channel. For example, error detection 130 is a signal indicating an error on the secondary channel, which may be sent to the processing logic 116, system safe logic 506, and/or safety monitor 120. Cross comparison errors 610 is based on a comparison of cross comparison data 123 sent by the processor of the primary channel and cross comparison data 131 sent by the processor of the secondary channel. For example, processing logic 116 (processor of primary channel) may send cross comparison data 123 via connection 158 to safety monitor. Processing logic 126 (processor of secondary channel) may send cross comparison data 131 via connection 156B to safety monitor 120 and/or to processing logic 116 via connection 156A. Cross comparison errors may be signaled from the safety monitor 120 to the system safe logic 506 via connection 168. In some embodiments, processing logic 116 compares cross comparison data 123 with cross comparison data 131 to determine if there is a cross comparison error 610. Processing logic 116 may then signal to safety monitor 120 that there is a cross comparison error 610 via connection 158, and safety monitor 120 may signal to system safe logic 506 via connection 168 that there is a cross comparison error 610. In some embodiments, safety monitor 120 compares cross comparison data 123 (via connection 158) with cross comparison data 133 (via connection 156B) to determine if there is a cross comparison error 610. Safety monitor 120 may signal to system safe logic 506 via connection 168 that there is a cross comparison error 610.

Channel 1 de-energize 602 connects to connection 170 and/or 176 to de-energize the connection that is sending the output data 121 of processing logic 116. Channel 2 de-energize 604 connects to connection 180 and/or 174 to de-energize the connection that is sending the output data 131 of processing logic 126.

ANDs 616, 620 implement logical 'and' functions. ORs 614, 622 implement a logical 'or' function. NOT 618 implements a logical 'not'. Safe-state (de-energize both channel) 612 connects to connection 178 to de-energize the connection that is sending the output data 121 or output data 123.

TABLE 1

Logic Table for FIG. 6

| INPUTS | | | OUTPUTS | | |
|---|---|---|---|---|---|
| Primary Channel Error 606 | Secondary Channel Error 608 | Cross Comparison Error 610 | Channel 1 De-Energize 602 | Channel 2 De-Energize 604 | Safe-State (De-energize both channels) 612 |
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 0 |
| 1 | 0 | 0 | 1 | 0 | 0 |
| 1 | 0 | 1 | 1 | 0 | 0 |
| 1 | 1 | 0 | 1 | 1 | 1 |
| 1 | 1 | 1 | 1 | 1 | 1 |

Table 1 indicates the operation of the outputs channel 1 de-energize 602, channel 2 de-energize 604, and safe state (de-energize both channels) 612. If one or the other channels indicates an error, then the system 500 will switch to the other output data 121, 131. The logic of FIG. 6 may be implemented by safety monitor 120, system safe logic 506, and/or control 512. System safe logic 506 may include a state 513 that may indicate the state of the outputs. Connection 572 may control the control 512 to select which output data 121, 123 is sent to connection 178. For example, system safe logic 506 may implement the functionality of Table 1 and connection 572 may de-energize connection 174 (channel 2 de-energize 604), de-energize connection 176 (channel 1 de-energize 602), go to safe state (e.g., de-energize connection 178), or select between connection 174 (use output data 131 from secondary channel) or connection 176 (use output data 123 from primary channel). In some embodiments, system safe logic 506 may de-energize connection 180 and/or connection 174 via connection 109. In some embodiments, system safe logic 506 may de-energize connection 170 and/or connection 176 via connection 111. In some embodiments, system safe logic 106 may de-energize connection 178 via connections 109, 111 by de-energizing connections 170/176 and 180/174. In some embodiments, control 512 is part of die 2 125 and safety monitor 120, which includes system safe logic 506, controls control 512 to select which output data 121 (from connection 158) or output data 131 (from connection 180) is sent to connection 178.

In some embodiments, secondary device 104 (e.g., processing logic 126) de-energizes connection 180 when error detection 130 are detected. In some embodiments, processing logic 116 de-energizes connection 158 when error detection 118 are detected. In some embodiments, channel 1 de-energize 602, channel 2 de-energize 604, and/or safe-state (de-energize both channels) 612 may indicate that output data 121, 131 and/or commands to actuators is not sent to sensor and actuator I/O 114.

Figure 7:
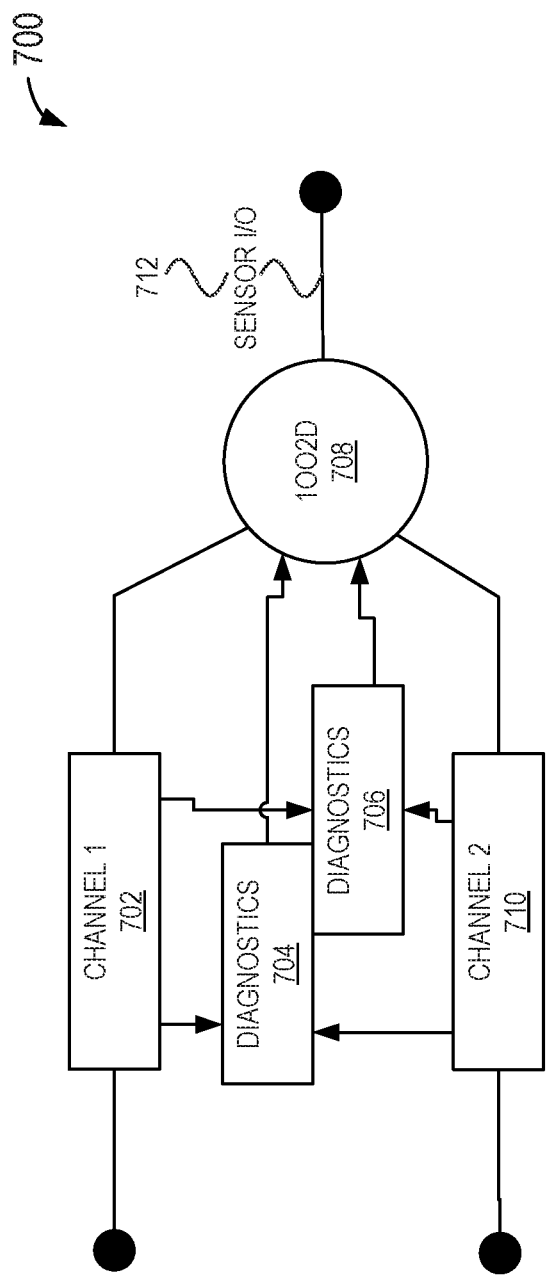
FIG. 7 is a loo2D architecture, in accordance with some embodiments.

FIG. 7 is a loo2D architecture 700, in accordance with some embodiments. Illustrated in FIG. 7 is channel 1 702, diagnostics 704, 706, channel 2 710, loo2D 708, and sensor I/O 712. loo2D architecture 700 may be configured to enter a safe state (e.g., de-energize sensor I/O 712) based on Table 1. Channel 1 702 may connection 176 (FIG. 5). Channel 2 710 may be connection 174 (FIG. 5). Channel 1 502 and channel 2 710 are channels for transmission of input and output data (e.g., input data 119, 129, output data 121, 131). Diagnostics 704, 706 and loo2D 708 may implement the loo2D system safe state logic 600 as disclosed in conjunction with Table 1, e.g., diagnostics 704, 706 and loo2D 708 may be system safe logic 506 and control 512 as disclosed in conjunction with FIG. 5. loo2D architecture 700 is compliant with IEC 61508, in accordance with some embodiments.

Some embodiments use less power as the secondary device 104 can be a low performance device that provides minimum safety functions that mirror the primary device 102. In some embodiments, the primary device 102 and/or secondary device 104 is configured to operate a human-machine interface (HMI). For example, primary device 102 and/or secondary device 104 may include an interface 216 (FIG. 2) to another computer or display and include an application for enabling a human to consume and enter information.

In some embodiments, the secondary device 104 communicates with die 1 115 and/or safety monitor 120 via application programming interface (API). For example, the cross-comparison data 131 may be transmitted to the processing logic 116 and/or safety monitor 120 via connection 156A and/or connection 156B by accessing an API. In some embodiments, the communication of the error detection 118, 130, input 119, 129, output 121, 131, and/or cross comparison data 123, 131 is performed by encrypting the data, e.g., using one or more black channel protocols or end to end (e2e) protocols.

In some embodiments, the system 100 may implement system 200 based on configuration parameters included in system 100, e.g., a configuration parameter may select whether to implement loo2 system safe state logic 300 or 1002d system safe state logic 600. An additional parameter may select whether to deactivate connection 150B. In some embodiments, system 100 may have a parameter that selects option a) where the cross-comparison data 133 is sent directly to the safety monitor 120 via connection 156B, or option b) where the cross-comparison data 133 is sent to the processing logic 116 via connection 156A. In option b) the processing logic 116 may either compare the cross-comparison data 123 with cross-comparison data 131 and send an error indication via connection 158 to safety monitor 120 if the do not match, or the processing logic 116 may forward the cross-comparison data 131 to the safety monitor 120 via connection 158.

In some embodiments, system 100 may have a parameter that selects option a) where error detection 130 are sent directly to the safety monitor 120 via connection 152B, or option b) where error detection 130 are sent to the processing logic 116 via connection 152A. In some embodiments, a first application is configured to receive input data 119 and generate output data 121 and cross-comparison data 123. In some embodiments, a second application is configured to receive input data 129 and generate output data 131 and cross comparison data 131. The first application and second application may be implemented in a combination of software, hardware, or firmware. The first application and the second application operate in a loosely coupled lockstep manner. The first application and second application may be non-identical, but the cross-comparison data 123, 131 must match, in accordance with some embodiments. In some embodiments, the safety monitor 120 reports to both processing logic 116 and processing logic 126 when a mismatch or error is detected between the cross-comparison data 123, 131. In some embodiments, system 100 and system 400 provide SIL2 or SIL3 for hardware failures and SC3 for systematic failures.

Figure 8:
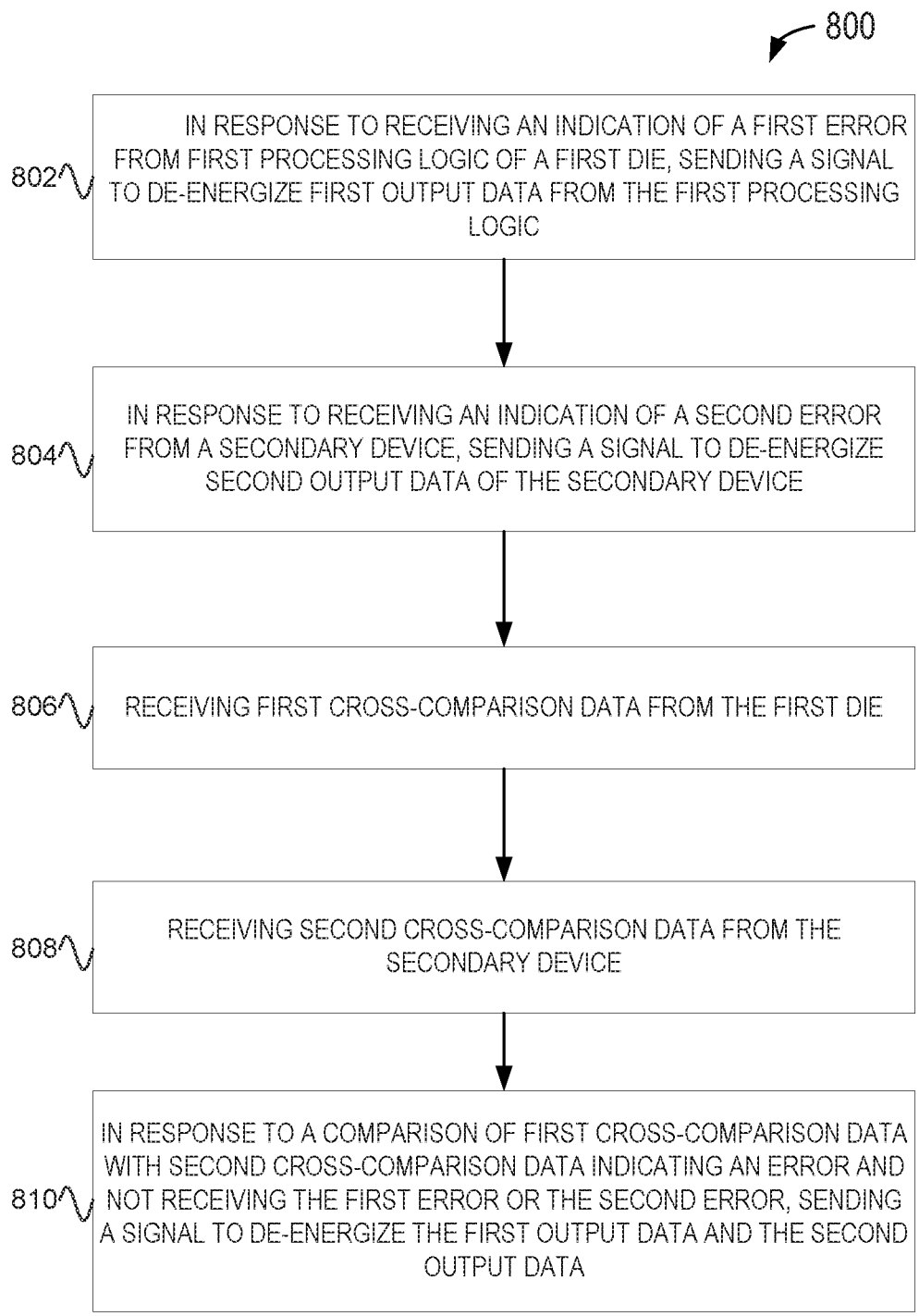
FIG. 8 illustrates a method for hardware fault tolerance, in accordance with some embodiments.

FIG. 8 illustrates a method 800 for hardware fault tolerance, in accordance with some embodiments. The method 800 begins at operation 802 with in response to receiving an indication of a first error from first processing logic of a first die, sending a signal to de-energize first output data from the first processing logic. For example, safety monitor 120 may receive an error 118 from die 1 115 via connection 161 and, in response, send a signal via connection 572 that disables the output data 121 from connection 170, 176.

The method 800 continues at operation 804 with in response to receiving an indication of a second error from a secondary device, sending a signal to de-energize second output data of the secondary device. For example, safety monitor 120 may receive an error 130 from secondary device 104 via connection 152*b* (or 152*a* via connection 158) and, in response, send a signal via connection 572 that disables the output data 131 from connection 180, 174.

The method 800 continues at operation 806 with receiving first cross-comparison data from the first die. For example, safety monitor 120 may receive cross-comparison data 123 from processing logic 116 via connection 158.

The method 800 continues at operation 808 with receiving second cross-comparison data from the secondary device. For example, safety monitor 120 may receive cross-comparison data 131 from processing logic 126 via connection 156b (or 156a via connection 158).

The method 800 continues at operation 810 with in response to a comparison of first cross-comparison data with second cross-comparison data indicating an error and not receiving the first error or the second error, sending a signal to de-energize the first output data and the second output data. For example, as disclosed in Table 1, safety monitor 120 may be configured to send a signal via connection 572 to de-energize connection 178 if error detection 118 and error detection 130 indicate no error, but a comparison of cross-comparison data 123 and cross-comparison data 133 indicate an error, e.g., they are not equal. In some embodiments, the first cross-comparison data is based on first output data and second cross-comparison data is based on second output data.

One or more of the operations of method 800 may be optional. Method 800 may include additional operations. Operations of method 800 may be performed in a different order, in accordance with some embodiments. The method 800 may be performed by an apparatus of a SoC with two dies, in accordance with some embodiments. One or more of the operations may be performed in a different sequence and/or simultaneously, e.g., operations 806, 808, 810 may be performed in a different order and/or simultaneously.

One or more of the operations of the method 800 may be performed by instructions 824 (FIG. 8). One or more of the operations of method 800 may be performed using the instruction format or register architecture as disclosed in FIGS. 9A, 9B, 10A, 10B, 10C, 10D, and/or 11. For example, an apparatus of a safety monitor 120 may use the instruction formats or register architecture as disclosed in FIGS. 9A, 9B, 10A, 10B, 10C, 10D, and/or 11. The processing logic 116, 126 may use the instruction format or register architecture as disclosed in FIGS. 9A, 9B, 10A, 10B, 10C, 10D, and/or 11. Die 1 115, die 2 125, and/or secondary device 104 may use the instruction format or architecture as disclosed in FIGS. 9A, 9B, 10A, 10B, 10C, 10D, and/or 11. Die 1 115, die 2 125, secondary device 104, and/or processing logic 116, 126 may include pipeline 1200 and/or core 1290, e.g., die 1 115 may be a core 1290.

Figure 13B:
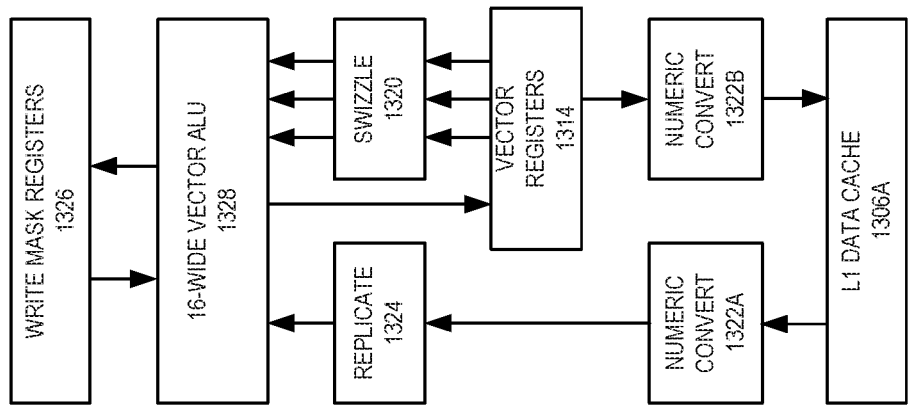
FIGS. 13A-13B illustrate block diagrams of a more specific in-order core architecture, which core would be one of several logic blocks (including other cores of the same type and/or different types) in a chip, according to an embodiment.
Figure 13A:
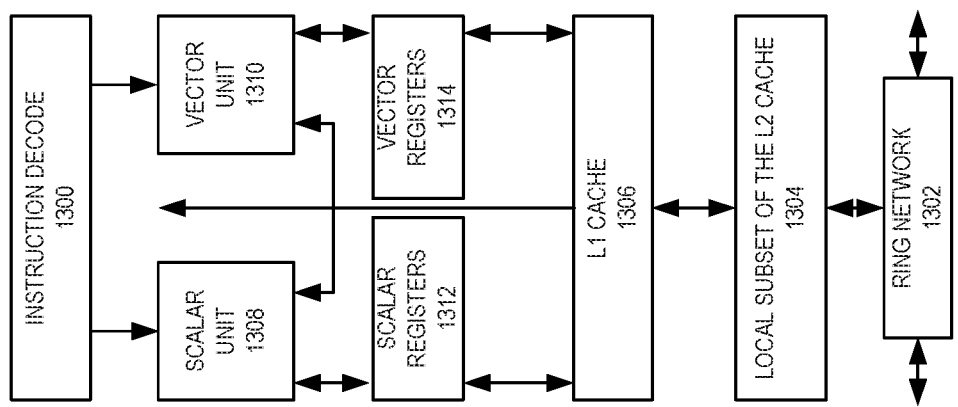

Die 1 115, die 2 125, and/or secondary device 104 may include one or more elements of the core architectures disclosed in FIGS. 13A and 13B. For example, the processing logic 116, 126 may use a cache 1306, 1304, 1306A, to implement the application. Die 1 115, die 2 125, and/or secondary device 104 may include or be included in one or more elements of the processor 1400 as disclosed in FIG. 14. For example, processing logic 116, 126 may be special purpose logic 1408, processor 1400 and/or connected to the processor 1400.

Die 1 115, die 2 125, and/or secondary device 104 may include or be included in one or more elements of the computer architectures of FIGS. 15-18. For example, referring to FIG. 5, I/O interface 124, 128 may be I/O 1560. Processing logic 116, 126, and/or safety monitor 120 may be processor 1510, etc. One or more of the elements of the computer architecture of FIGS. 15-18 may be duplicated for die 1 115, die 2 125, secondary device 104. In some embodiments, VF 1696 is I/O interface 124, 128, and sensor and actuator I/O 114 includes comm device 1627 that are external to the primary device 102.

In some embodiments, die 1 115 may be implemented with the system on a chip 1800 where an additional die provides an additional system on a chip 1800 for die 2 125. In some embodiments, application (not illustrated) that is run by the processing logic 116 with a duplicate run by processing logic 126 is implemented partially in software, e.g., a high level language 1902 where the high level language 1902 is processed for processor without an X86 instruction set core 1914 or a processor with at least one x86 instruction set core 1916, in accordance with some embodiments.

A processor subsystem may be used to execute the operations on a machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

The figures below detail architectures and systems to implement embodiments of the above. In some embodiments, one or more hardware components and/or instructions described above are emulated as detailed below or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014). Instruction Formats Embodiments of the instruction(s) described herein may be embodied in different formats. Additionally, systems, architectures, and pipelines are detailed below. Embodiments of the instruction(s) may be executed on such systems, architectures, and pipelines, but are not limited to those detailed. Generic Vector Friendly Instruction Format A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 9A-9B are block diagrams illustrating a generic vector friendly instruction format and instruction templates thereof according to an embodiment. FIG. 9A is a block diagram illustrating a generic vector friendly instruction format and class A instruction templates thereof according to an embodiment; while FIG. 9B is a block diagram illustrating the generic vector friendly instruction format and class B instruction templates thereof according to an embodiment. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed below in the order illustrated in FIGS. 9A-9B. Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations. Register index field 944—its content, directly or through address generation, specifies the locations of the source and destination operands, be they in registers or in memory. These include a sufficient number of bits to select N registers from a PxQ (e.g., 32×512, 16×128, 32×1024, 64×1024) register file. While in an embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in an embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In an embodiment, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses 2scale*index+base). Displacement Field 962A—its content is used as part of memory address generation (e.g., for address generation that uses 2scale*index+base+displacement).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in another embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in an embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-9B, the contents of this field select between class A and class B instructions. In FIGS. 9A-9B, rounded corner squares are used to indicate a specific value is present in a field (e.g., class A 968A and class B 968B for the class field 968 respectively in FIGS. 9A-9B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In an embodiment where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In an embodiment where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format. The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Specific Vector Friendly Instruction Format

FIG. 10 is a block diagram illustrating a specific vector friendly instruction format according to an embodiment. FIG. 10 shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10 map are illustrated.

It should be understood that, although embodiments are described with reference to the specific vector friendly instruction format 1000 in the context of the generic vector friendly instruction format 900 for illustrative purposes, the invention is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the invention is not so limited (that is, the generic vector friendly instruction format 900 contemplates other sizes of the data element width field 964).

The generic vector friendly instruction format 900 includes the following fields listed below in the order illustrated in FIG. 10A. EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in an embodiment).

The second-fourth bytes (EVEX Bytes 1-3) include a number of bit fields providing specific capability. REX field 1005 (EVEX Byte 1, bits [7-5])—consists of an EVEX.R bit field (EVEX Byte 1, bit [7]—R), EVEX.X bit field (EVEX byte 1, bit [6]—X), and 957BEX byte 1, bit [5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]—R') that is used to encode either the upper 16 or lower 16 of the extended 32 register set. In an embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3). Data element width field 964 (EVEX byte 2, bit [7]—W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]—U)—If EVEX.U=0, it indicates class A or EVEX.U0; if EVEX.U=1, it indicates class B or EVEX.U1. Prefix encoding field 1025 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In an embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]—EH; also known as EVEX.EH, EVEX.rs, EVEX.RL, EVEX.write mask control, and EVEX.N; also illustrated with α)—as previously described, this field is context specific. Beta field 954 (EVEX byte 3, bits [6:4]—SSS, also known as EVEX.s2-0, EVEX.r2-0, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]—kkk)—its content specifies the index of a register in the write mask registers as previously described. In an embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field. MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset) Immediate field 972 operates as previously described.

Full Opcode Field

FIG. 10B is a block diagram illustrating the fields of the specific vector friendly instruction format 1000 that make up the full opcode field 974 according to an embodiment. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to an embodiment. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
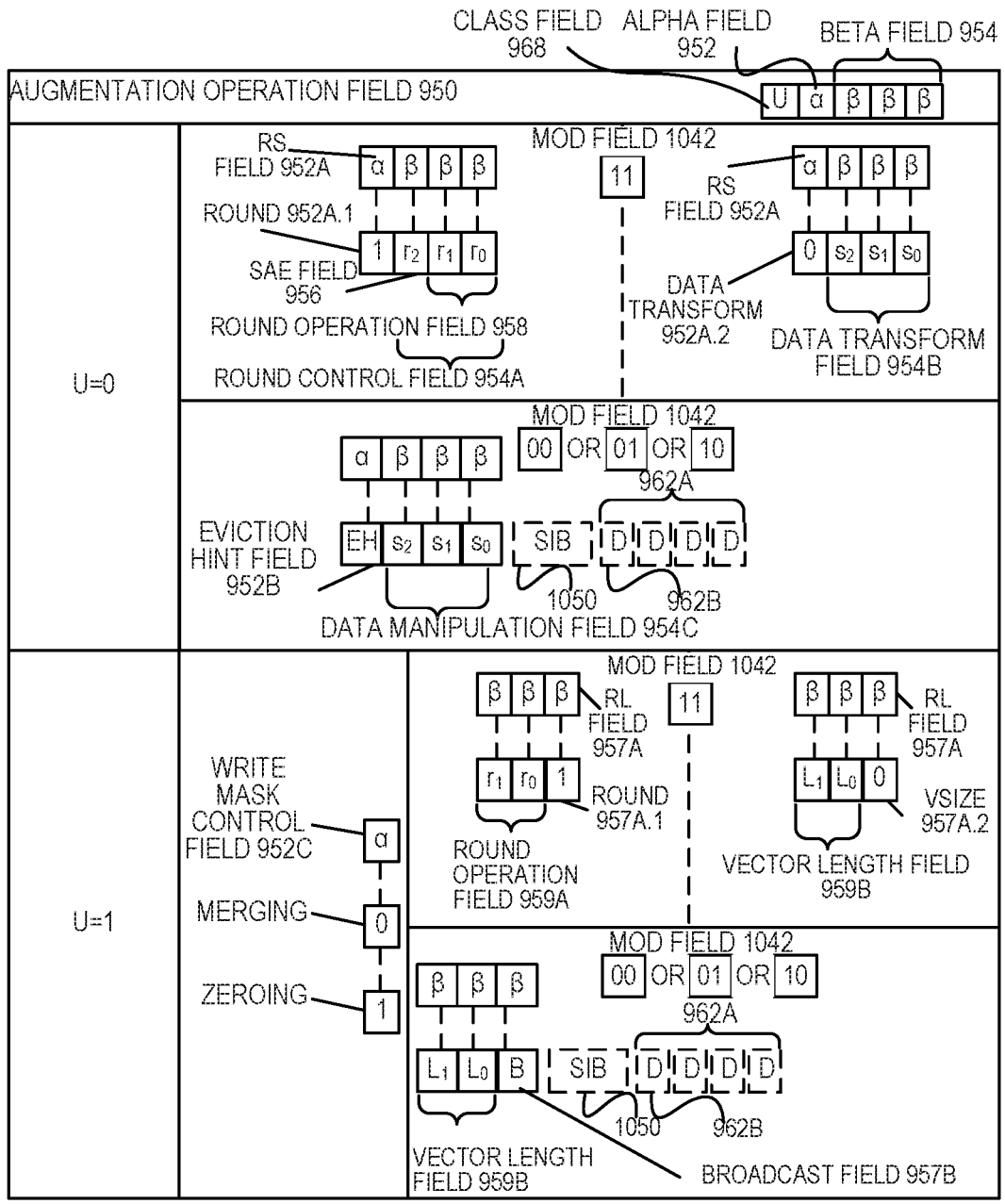

FIG. 10D is a block diagram illustrating the fields of the specific vector friendly instruction format 1000 that make up the augmentation operation field 950 according to an embodiment. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]—SSS) is interpreted as a three bit data transform field 954B. When U=0 and the MOD field 1042 contains 00, 01, or 10 (signifying a memory access operation), the alpha field 952 (EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—S0) is interpreted as the RL field 957A; when it contains a 1 (round 957A.1) the rest of the beta field 954 (EVEX byte 3, bit [6-5]—S2-1) is interpreted as the round operation field 959A, while when the RL field 957A contains a 0 (VSIZE 957.A2) the rest of the beta field 954 (EVEX byte 3, bit [6-5]—S2-1) is interpreted as the vector length field 959B (EVEX byte 3, bit [6-5]—L1-0). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—L1-0) and the broadcast field 957B (EVEX byte 3, bit [4]—B).

Register Architecture

Figure 11:
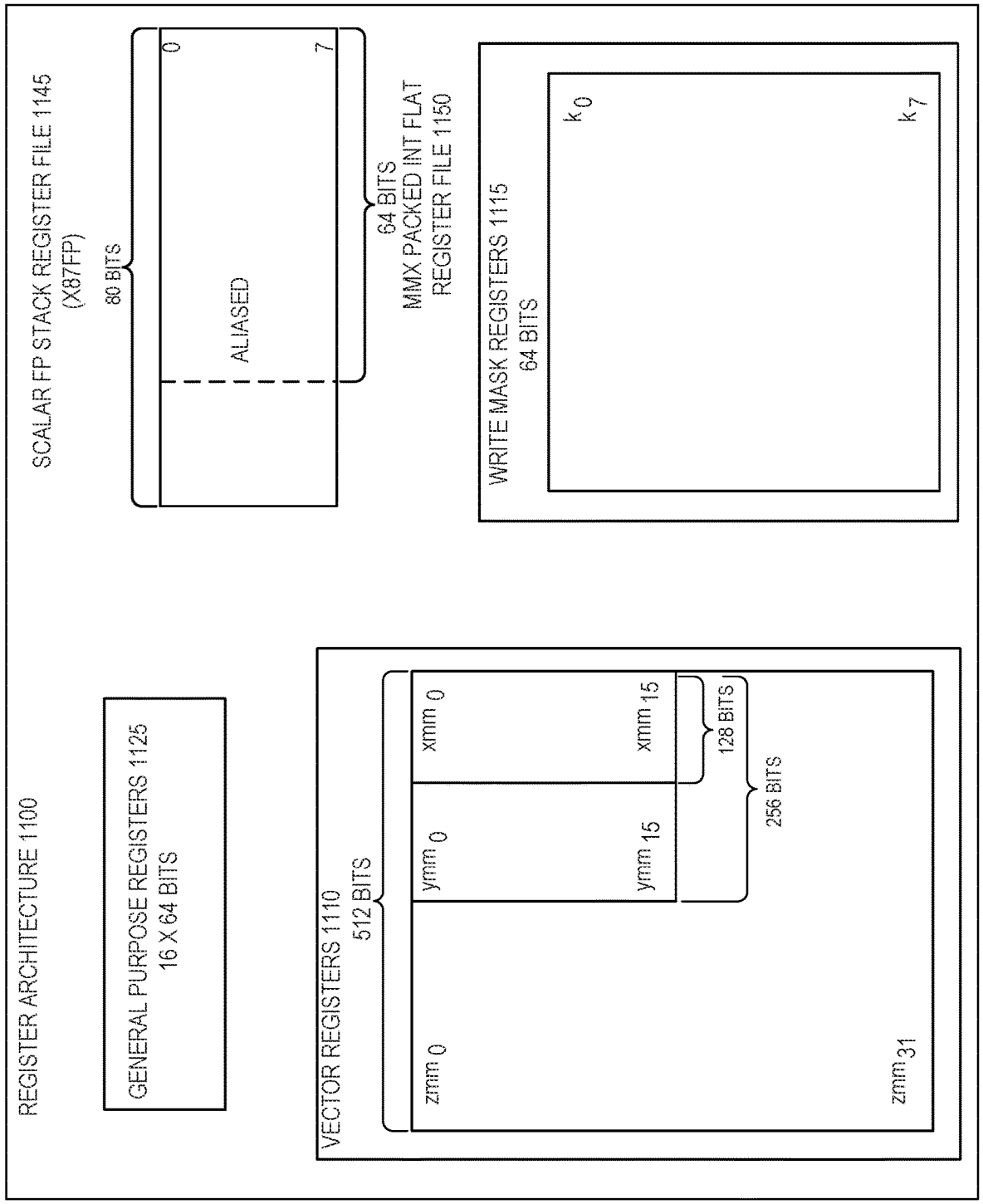
FIG. 11 is a block diagram of a register architecture according to an embodiment.

FIG. 11 is a block diagram of a register architecture 1100 according to an embodiment. In the embodiment illustrated, there are 32 vector registers 1110 that are 512 bits wide; these registers are referenced as zmm0 through zmm31 The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

Adjustable Vector Length Class Operations Registers

Instruction Templates that do not include the vector length field 959B A (FIG. 9A; U=0) 910, 915, 925, 930 zmm registers (the vector length is 64 byte). B (FIG. 9B; U=1) 912 zmm registers (the vector length is 64 byte). Instruction templates that do include the vector length field 959B B (FIG. 9B; U=1) 917, 927 zmm, ymm, or xmm registers (the vector length is 64 byte, 32 byte, or 16 byte) depending on the vector length field 959B.

In other words, the vector length field 959B selects between a maximum length and one or more other shorter lengths, where each such shorter length is half the length of the preceding length; and instructions templates without the vector length field 959B operate on the maximum vector length. Further, in an embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in an embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and WM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Core architectures are described next, followed by descriptions of processors and computer architectures.

Core Architectures

In-order and out-of-order core block diagram. FIG. 12A is a block diagram illustrating both an in-order pipeline and a register renaming, out-of-order issue/execution pipeline according to embodiments. FIG. 12B is a block diagram illustrating both an embodiment of an in-order architecture core and a register renaming, out-of-order issue/execution architecture core to be included in a processor according to an embodiment. The solid lined boxes in FIGS. 12A-12B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, microcode entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In an embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In an embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In an embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In an embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific in-Order Core Architecture

FIGS. 13A-13B illustrate a block diagram of a more specific in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to an embodiment. In an embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to an embodiment. FIG. 13B includes an L1 data cache 1306A part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
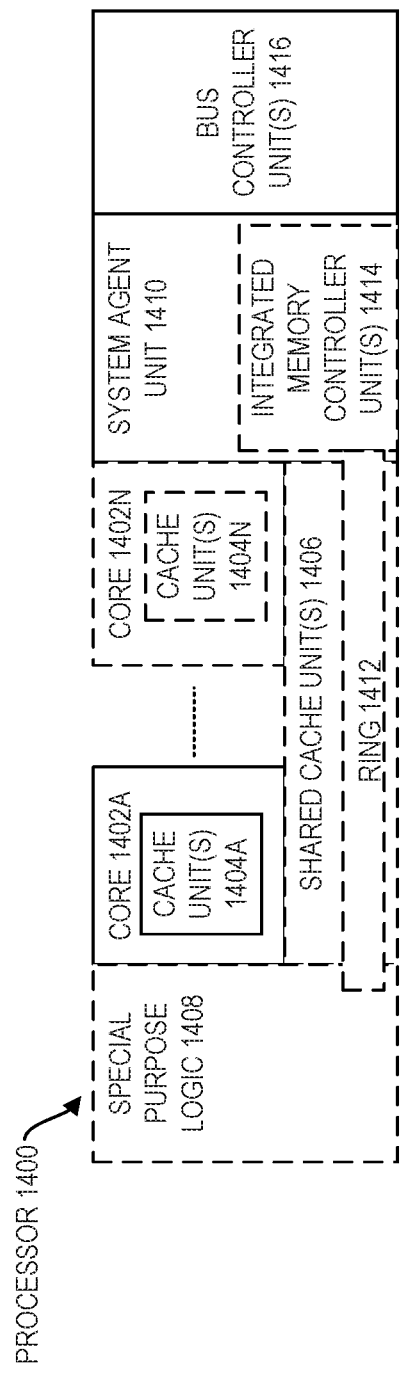
FIG. 14 is a block diagram of a processor that may have more than one core, may have an integrated memory controller, and may have integrated graphics according to an embodiment.

FIG. 14 is a block diagram of a processor 1400 that may have more than one core, may have an integrated memory controller, and may have integrated graphics according to embodiments. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In an embodiment, coherency is maintained between one or more cache units 1404A-N and cores 1402A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Computer Architectures

FIGS. 15-18 are block diagrams of computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
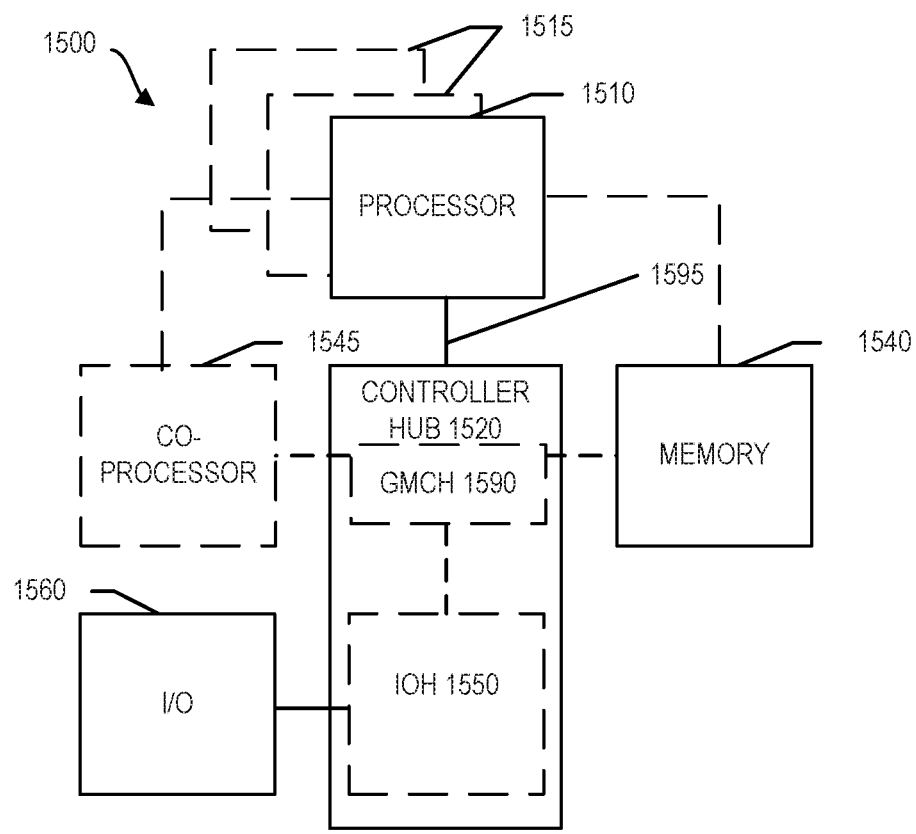
FIGS. 15-18 are block diagrams of computer architectures, according to an embodiment.

Referring now to FIG. 15, shown is a block diagram of a system 1500 according to an embodiment. The system 1500 may include one or more processors 1510, 1515, which are coupled to a controller hub 1520. In an embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In an embodiment, the coprocessor 1545 is a special-purpose processor, such as, for example, a high-throughput MIC processor, a network or communication processor, compression engine, graphics processor, GPGPU, embedded processor, or the like. In an embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In an embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
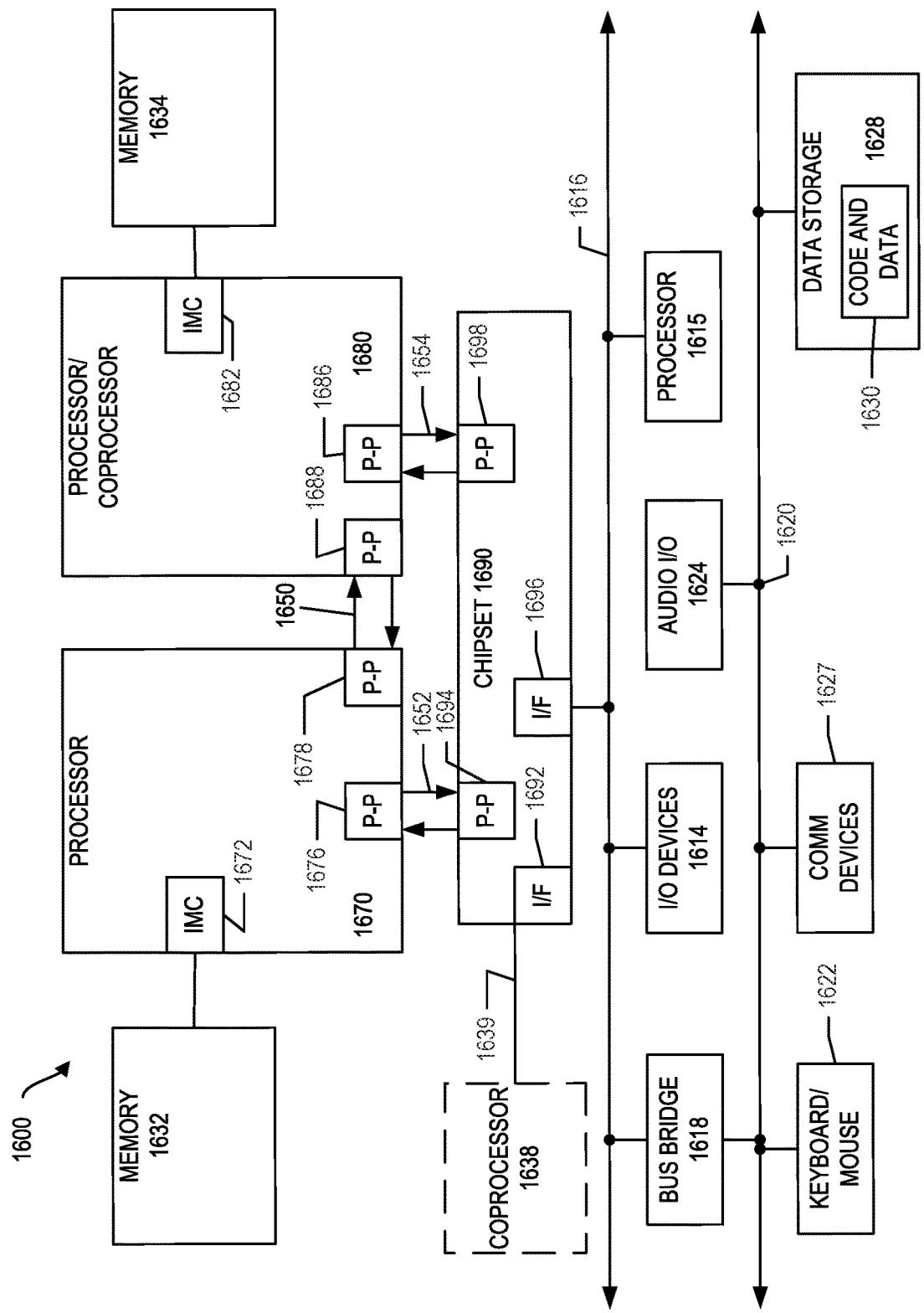

Referring now to FIG. 16, shown is a block diagram of a first more specific system 1600 in accordance with an embodiment. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In an embodiment, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In an embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In an embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In an embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In an embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in an embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
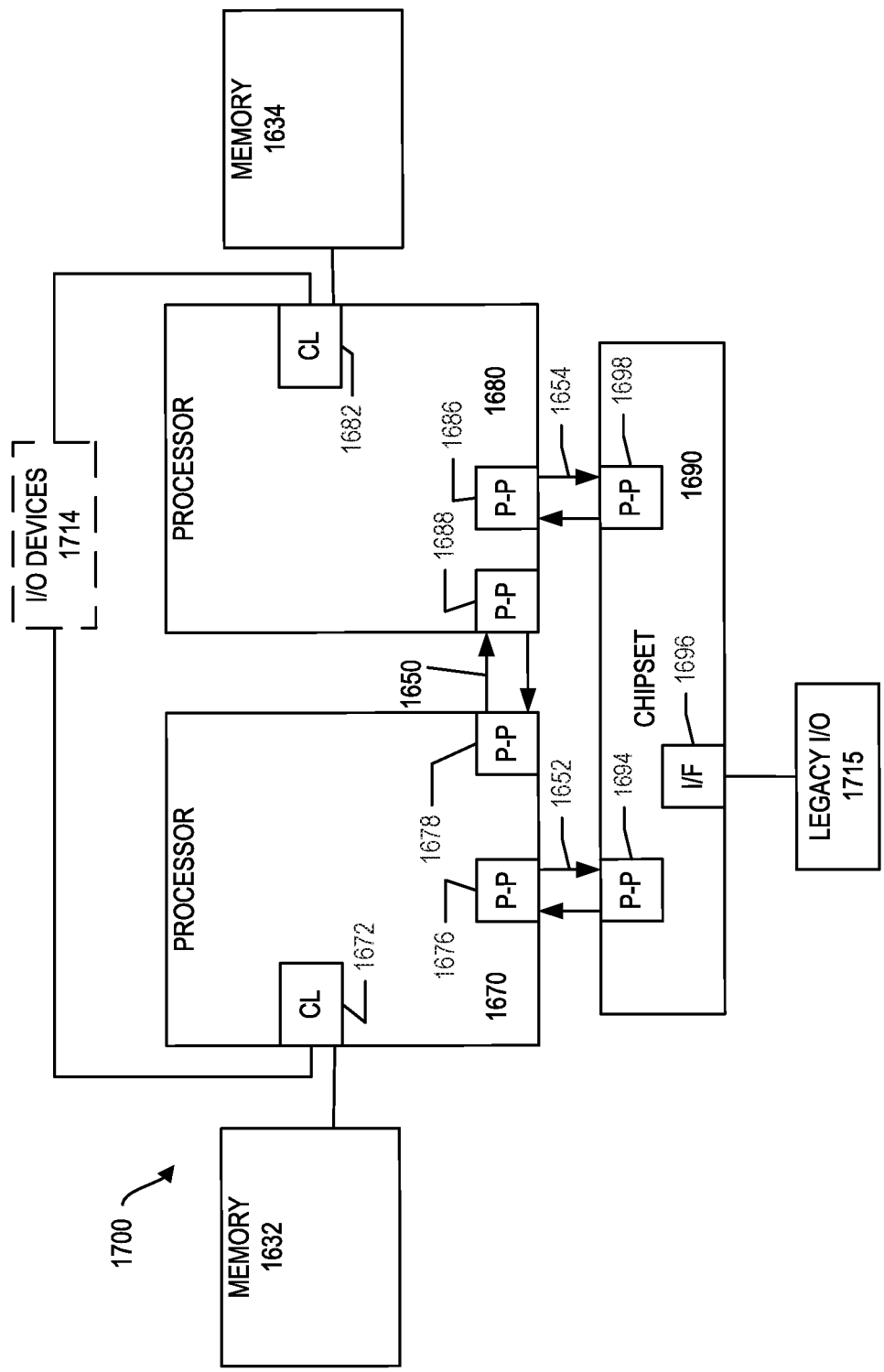

Referring now to FIG. 17, shown is a block diagram of a second more specific system 1700 in accordance with an embodiment. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
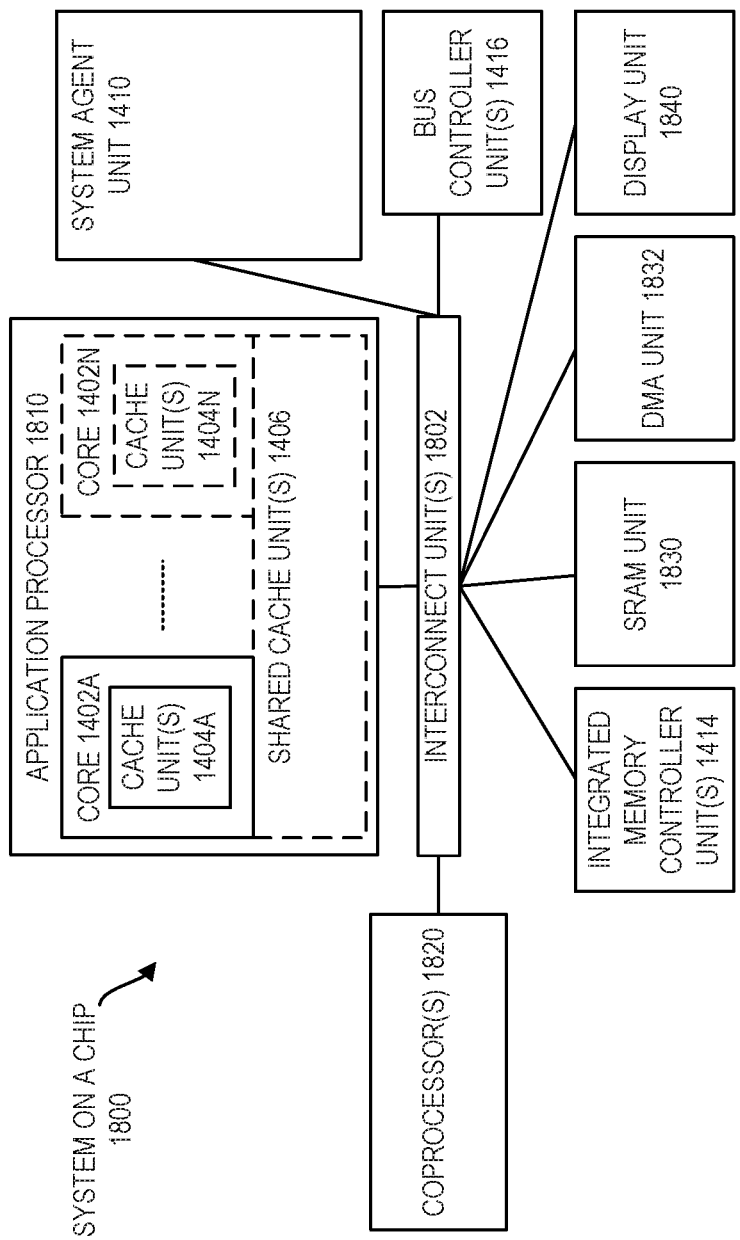

Referring now to FIG. 18, shown is a block diagram of a SoC 1800 in accordance with an embodiment. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N with integrated cache units 1404A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In an embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.) In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
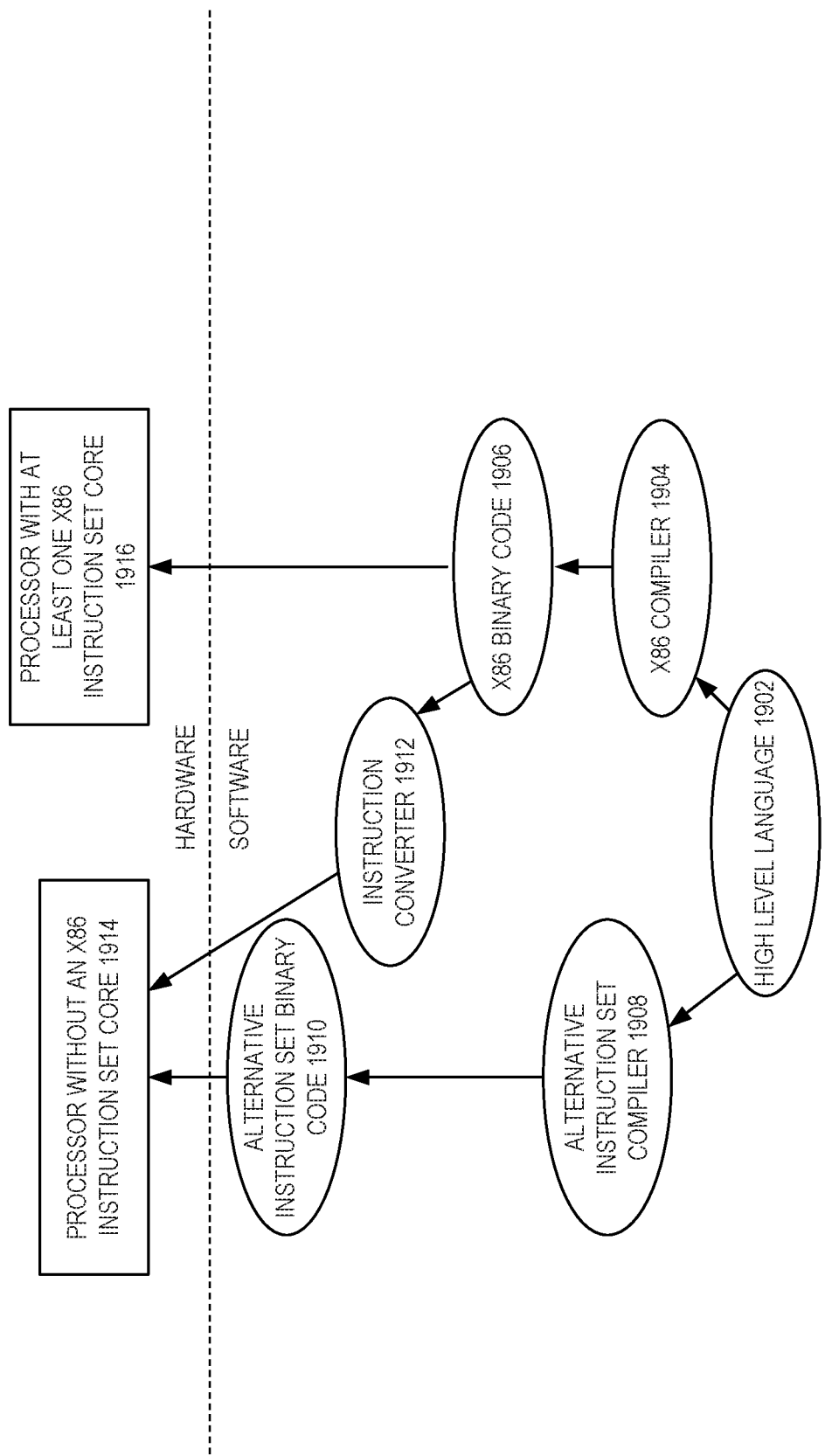
FIG. 19 is a block diagram contrasting the use of a software instruction converter to convert binary instructions in a source instruction set to binary instructions in a target instruction set according to an embodiment.

FIG. 19 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Figure 20:
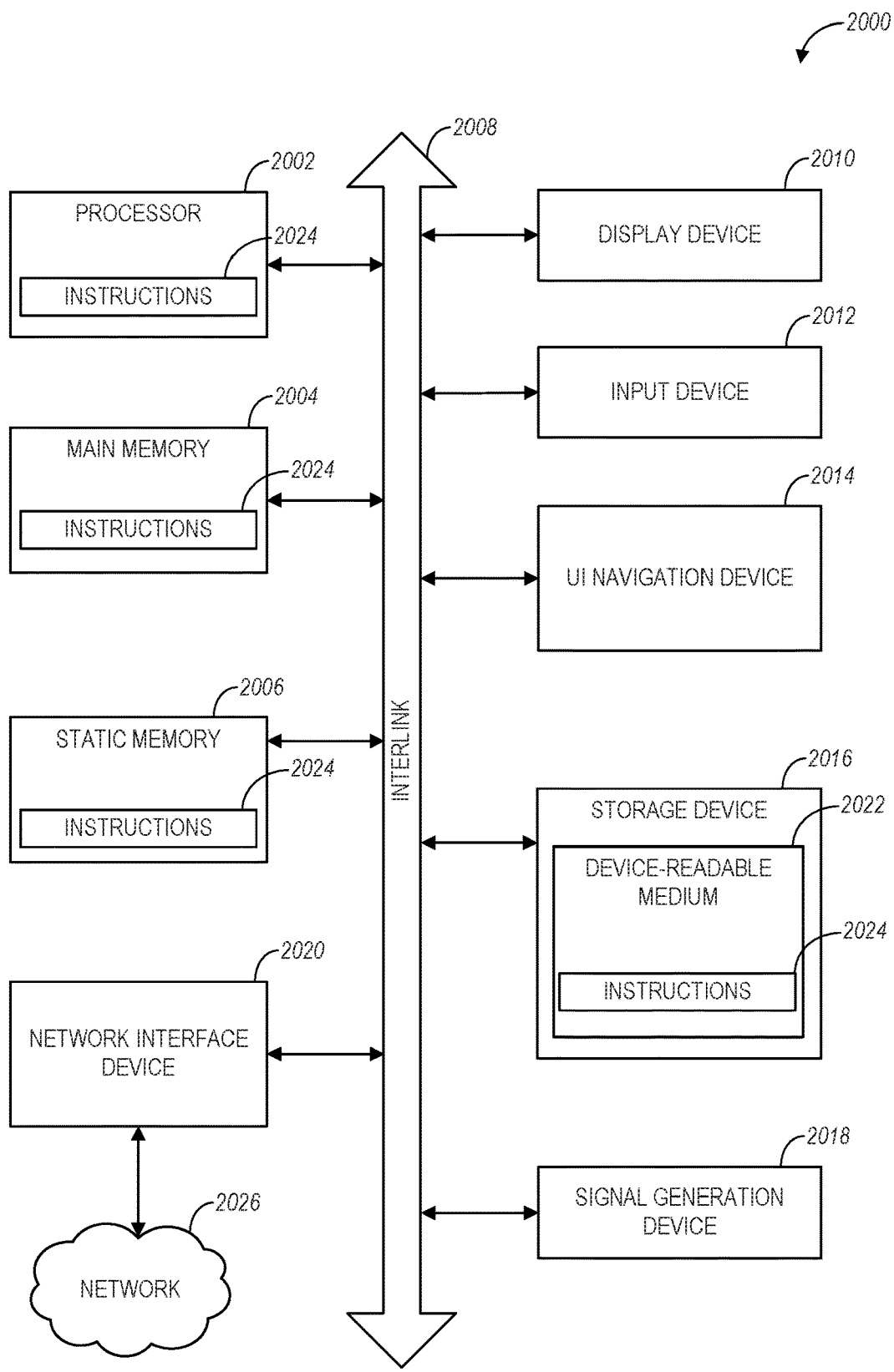
FIG. 20 is a block diagram illustrating an example machine upon which any one or more of the techniques (e.g., methodologies) discussed herein may perform, according to an embodiment.

FIG. 20 is a block diagram illustrating a machine in the example form of a computer system 2000, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 2000 includes at least one processor 2002 (e.g., a central processing unit (CPU), a graphics processing unit (GPU) or both, processor cores, compute nodes, etc.), a main memory 2004 and a static memory 2006, which communicate with each other via a link 2008 (e.g., bus). The computer system 2000 may further include a video display unit 2010, an alphanumeric input device 2012 (e.g., a keyboard), and a user interface (UI) navigation device 2014 (e.g., a mouse). In one embodiment, the video display unit 2010, input device 2012 and UI navigation device 2014 are incorporated into a touch screen display. The computer system 2000 may additionally include a storage device 2016 (e.g., a drive unit), a signal generation device 2018 (e.g., a speaker), a network interface device 2020, and one or more sensors (not shown), such as a global positioning system (GPS) sensor, compass, accelerometer, gyrometer, magnetometer, or other sensor.

The storage device 2016 includes a machine-readable medium 2022 on which is stored one or more sets of data structures and instructions 2024 (e.g., software) embodying or utilized by any one or more of the methodologies or functions described herein. The instructions 2024 may also reside, completely or at least partially, within the main memory 2004, static memory 2006, and/or within the processor 2002 during execution thereof by the computer system 2000, with the main memory 2004, static memory 2006, and the processor 2002 also constituting machine-readable media.

While the machine-readable medium 2022 is illustrated in an example embodiment to be a single medium, the term "machine-readable medium" may include a single medium or multiple media (e.g., a centralized or distributed database, and/or associated caches and servers) that store the one or more instructions 2024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 2024 may further be transmitted or received over a communications network 2026 using a transmission medium via the network interface device 2020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 is an apparatus of a system, the apparatus comprising: a first die, the first die comprising: first processing logic; a first connection to second processing logic of a second die, the first connection coupled to the first processing logic; a second connection to an input/output (I/O) channel, the second connection coupled to the first processing logic; a memory coupled to the first processing logic; the second die, the second die comprising: second processing logic; a third connection from a secondary device, wherein the secondary device is outside the system, and the third connection is coupled to the second processing logic; a memory coupled to the second processing logic, wherein the second processing logic is configured to: in response to receiving an indication of a first error from the first die, send a signal to de-energize first output data from the second connection; in response to receiving an indication of a second error from the secondary device via the third connection, send a signal to de-energize second output data of the secondary device; receive first cross-comparison data from the first die; receive second cross-comparison data from the secondary device; and in response to a comparison of first cross-comparison data with second cross-comparison data indicating an error and not receiving the first error or the second error, send a signal to de-energize the first output data and the second output data.

In Example 2, the subject matter of Example 1 includes, wherein the first cross-comparison data is based on first output data and second cross-comparison data is based on second output data.

In Example 3, the subject matter of Examples 1-2 includes, wherein the second processing logic is further configured to: in response to a comparison of first cross-comparison data with second cross-comparison data indicating the error and receiving the first error and the second error, send the signal to de-energize the first output data and the second output data.

In Example 4, the subject matter of Examples 1-3 includes, wherein the system further comprises a first power source, a first clock, and a first fuse, wherein the first power source, the first clock, and the first fuse are coupled to the first die; and a second power source, a second clock, and a second fuse, wherein the second power source, the second clock, and the second fuse are coupled to the second die.

In Example 5, the subject matter of Examples 1-4 includes, wherein the first processing logic is further configured to: receive input data from external sensors via the second connection; generate output data based on the input; and send the output data via the second connection.

In Example 6, the subject matter of Example 5 includes, wherein the first processing logic is further configured to: generate the first comparison data based on the output data.

In Example 7, the subject matter of Examples 1-6 includes, wherein the system is a system on a chip (SoC).

In Example 8, the subject matter of Examples 1-7 includes, wherein the system further comprises: a switch, the switch configured to receive the first output data from the first processing logic on a fourth connection and the second output data from the secondary device on a fifth connection and to output third output data on a sixth connection, wherein the switch is configured to receive signals from the second processing logic on a seventh connection.

In Example 9, the subject matter of Example 8 includes, wherein the switch is further configured to: select among three configurations based on the signals from the second processing logic and the secondary device, the three configurations comprising: sending the first output data on the sixth connection, sending the second output data on the sixth connection, and de-energizing the sixth connection.

In Example 10, the subject matter of Examples 1-9 includes, wherein the first die further comprises: third processing logic to detect errors with the first die, wherein the third processing logic is configured to send an indication of errors with the first die to the first processing logic or the second processing logic.

In Example 11, the subject matter of Examples 1-10 includes, wherein the second die further comprises: fourth processing logic to detect errors with the second die, wherein the fourth processing logic is configured to send an indication of errors with the second die to the second processing logic; and, wherein the second processing logic is further configured to: in response to an indication of errors with the second die, send the signal to de-energize the first output data and the second output data.

In Example 12, the subject matter of Examples 1-11 includes, wherein the second connection is configured to connect to the second die, and wherein the second die further comprises an I/O interface, the I/O interface comprising I/O pins for receiving and sending data to an external device, wherein the second connection is connected to the I/O interface.

In Example 13, the subject matter of Examples 1-12 includes, wherein the second connection is configured to receive input from sensors and the first output data comprises data to control actuators, and wherein the third connection is configured to receive the input from the sensors and the second output data comprises the data to control actuators.

In Example 14, the subject matter of Examples 1-13 includes, wherein the first processing logic is configured to concurrently and redundantly implement a same application as the secondary device.

In Example 15, the subject matter of Examples 1-14 includes, wherein the processing logic is further configured to: receive second error from the secondary device and send the second error to the second die.

In Example 16, the subject matter of Examples 1-15 includes, wherein the processing logic is further configured to: receive second comparison data from the secondary device and send the second comparison data to the second processing logic.

In Example 17, the subject matter of Examples 1-16 includes, wherein the system is an integrated circuit, and the first die and the second die are part of the integrated circuit.

In Example 18, the subject matter of Examples 1-17 includes, wherein the first cross-comparison data is a first error detection code based on the first output data and the second cross-comparison data is a second error detection code based on the second output data, and wherein in response to the comparison further comprises: when the first cross-comparison data and the second cross-comparison data are not equal, the first cross-comparison data and the second cross-comparison data indicate the error.

In Example 19, the subject matter of Examples 1-18 includes, wherein the first output data from the second connection and second output data of the secondary device comprise commands for actuators.

Example 20 is at least one machine-readable medium including instructions for hardware fault tolerance, which when executed on a machine, cause the machine to perform operations comprising: in response to receiving an indication of a first error from a first die, sending a signal to de-energize first output data from a first processing logic, wherein the first die comprises the first processing logic; in response to receiving an indication of a second error from a secondary device, sending a signal to de-energize second output data of the secondary device; receiving first cross-comparison data from the first die; receiving second cross-comparison data from the secondary device; and in response to a comparison of first cross-comparison data with second cross-comparison data indicating an error and not receiving the first error or the second error, sending a signal to de-energize the first output data and the second output.

In Example 21, the subject matter of Example 20 includes, wherein the first cross-comparison data is based on first output data and second cross-comparison data is based on second output data.

In Example 22, the subject matter of Examples 20-21 includes, wherein the operations further comprise: in response to a comparison of first cross-comparison data with second cross-comparison data indicating the error and receiving the first error and the second error, sending the signal to de-energize the first output data and the second output.

In Example 23, the subject matter of Examples 20-22 includes, wherein the operations further comprise: receive input data from external sensors via the second connection; generate output data based on the input; and send the output data via the second connection.

In Example 24, the subject matter of Example 23 includes, wherein the operations further comprise: generate the first comparison data based on the output data.

In Example 25, the subject matter of Examples 20-24 includes, wherein the operations further comprise: receive second error from the secondary device and send the second error to the second die.

In Example 26, the subject matter of Examples 20-25 includes, wherein the operations further comprise: receive second comparison data from the secondary device and send the second comparison data to the second processing logic.

In Example 27, the subject matter of Examples 20-26 includes, wherein the first cross-comparison data is a first error detection code based on the first output data and the second cross-comparison data is a second error detection code based on the second output data, and wherein in response to the comparison further comprises: when the first cross-comparison data and the second cross-comparison data are not equal, the first cross-comparison data and the second cross-comparison data indicate the error.

In Example 28, the subject matter of Examples 20-27 includes, wherein the first output data from the second connection and second output data of the secondary device comprise commands for actuators.

Example 29 is a method for hardware fault tolerance, the method comprising: in response to receiving an indication of a first error from first processing logic of a first die, sending a signal to de-energize first output data from the first processing logic; in response to receiving an indication of a second error from a secondary device, sending a signal to de-energize second output data of the secondary device; receiving first cross-comparison data from the first die; receiving second cross-comparison data from the secondary device; and in response to a comparison of first cross-comparison data with second cross-comparison data indicating an error and not receiving the first error or the second error, sending a signal to de-energize the first output data and the second output.

In Example 30, the subject matter of Example 29 includes, wherein the first cross-comparison data is based on first output data and second cross-comparison data is based on second output data.

In Example 31, the subject matter of Examples 29-30 includes, wherein the method further comprises: in response to a comparison of first cross-comparison data with second cross-comparison data indicating the error and receiving the first error and the second error, sending the signal to de-energize the first output data and the second output data.

In Example 32, the subject matter of Examples 29-31 includes, wherein the method further comprises: receiving input data from external sensors via the second connection; generating output data based on the input; and sending the output data via the second connection.

In Example 33, the subject matter of Examples 29-32 includes, wherein the method further comprises: generate the first comparison data based on the output data.

In Example 34, the subject matter of Examples 29-33 includes, wherein the method further comprises: receiving second error from the secondary device and send the second error to the second die.

In Example 35, the subject matter of Examples 29-34 includes, wherein the method further comprises: receiving second comparison data from the secondary device and send the second comparison data to the second processing logic.

In Example 36, the subject matter of Examples 29-35 includes, wherein the first cross-comparison data is a first error detection code based on the first output data and the second cross-comparison data is a second error detection code based on the second output data, and in response to the comparison further comprises: when the first cross-comparison data and the second cross-comparison data are not equal, the first cross-comparison data and the second cross-comparison data indicate the error.

In Example 37, the subject matter of Examples 29-36 includes, wherein the first output data from the second connection and second output data of the secondary device comprise commands for actuators.

Example 38 is an apparatus of a system, the apparatus comprising: means for a first die, the first die comprising: means for first processing logic; means for a first connection to second processing logic of a second die, the first connection coupled to the first processing logic; means for a second connection to an input/output (I/O) channel, the second connection coupled to the first processing logic; means for a memory coupled to the first processing logic; the second die, the second die comprising: means for second processing logic; means for a third connection from a secondary device, wherein the secondary device is outside the system, and the third connection is coupled to the second processing logic; means for a memory coupled to the second processing logic, wherein the second processing logic is configured to: in response to receiving an indication of a first error from the first die, means for sending a signal to de-energize first output data from the second connection; in response to receiving an indication of a second error from the secondary device via the third connection, means for sending a signal to de-energize second output data of the secondary device; means for receiving first cross-comparison data from the first die; means for receiving second cross-comparison data from the secondary device; and in response to a comparison of first cross-comparison data with second cross-comparison data indicating an error and not receiving the first error or the second error, means for sending a signal to de-energize the first output data and the second output data.

In Example 39, the subject matter of Example 38 includes, wherein the first cross-comparison data is based on first output data and second cross-comparison data is based on second output data.

In Example 40, the subject matter of Examples 38-39 includes, wherein the means for second processing logic further comprises: in response to a comparison of first cross-comparison data with second cross-comparison data indicating the error and receiving the first error and the second error, means for sending the signal to de-energize the first output data and the second output data.

In Example 41, the subject matter of Examples 38-40 includes, wherein the system further comprises means for a first power source, means for a first clock, and means for a first fuse, wherein the means for the first power source, the means for the first clock, and the means for the first fuse are coupled to the means for the first die.

In Example 42, the subject matter of Examples 36-41 includes, wherein the means for the first processing logic further comprises: means for receiving input data from external sensors via the second connection; means for generating output data based on the input; and means for sending the output data via the second connection.

In Example 43, the subject matter of Example 42 includes, wherein the means for the first processing logic further comprises: means for generating the first comparison data based on the output data.

In Example 44, the subject matter of Examples 36-43 includes, wherein the system is a system on a chip (SoC).

In Example 45, the subject matter of Examples 36-44 includes, wherein the system further comprises: means for a switch, wherein the means for the switch is configured to receive the first output data from the first processing logic on a fourth connection and the second output data from the secondary device on a fifth connection and to output third output data on a sixth connection, wherein the means for the switch is configured to receive signals from the second processing logic on a seventh connection.

In Example 46, the subject matter of Example 45 includes, wherein the means for the switch is further comprises: means for selecting among three configurations based on the signals from the second processing logic and the secondary device, the three configurations comprising: sending the first output data on the sixth connection, sending the second output data on the sixth connection, and de-energizing the sixth connection.

In Example 47, the subject matter of Examples 36-46 includes, wherein the first die further comprises: means for third processing logic to detect errors with the first die, wherein the means for the third processing logic is configured to send an indication of errors with the first die to the first processing logic or the second processing logic.

In Example 48, the subject matter of Examples 36-47 includes, wherein the means for the second die further comprises: means for fourth processing logic to detect errors with the second die, wherein the means for the fourth processing logic is configured to send an indication of errors with the second die to the second processing logic; and, wherein the means for the second processing logic is further comprises: in response to an indication of errors with the second die, means for sending the signal to de-energize the first output data and the second output data.

In Example 49, the subject matter of Examples 36-48 includes, wherein the means for the second connection is configured to connect to the second die, and wherein the means for the second die further comprises means for an I/O interface, the means for the I/O interface comprising I/O pins for receiving and sending data to an external device, wherein the means for the second connection is connected to the I/O interface.

In Example 50, the subject matter of Examples 36-49 includes, wherein the means for the second connection is configured to receive input from sensors and the first output data comprises data to control actuators, and wherein the means for the third connection is configured to receive the input from the sensors and the second output data comprises the data to control actuators.

In Example 51, the subject matter of Examples 36-50 includes, wherein the means for the first processing logic is configured to concurrently and redundantly implement a same application as the secondary device. In Example 52, the subject matter of Examples 36-51 includes, wherein the means for the processing logic is further comprises: means for receiving second error from the secondary device and send the second error to the second die.

In Example 53, the subject matter of Examples 36-52 includes, wherein the means for the processing logic is further comprises: means for receiving second comparison data from the secondary device and send the second comparison data to the second processing logic.

In Example 54, the subject matter of Examples 36-53 includes, wherein the system is an integrated circuit, and the means for the first die and the means for the second die are part of the integrated circuit.

In Example 55, the subject matter of Examples 36-54 includes, wherein the first cross-comparison data is a first error detection code based on the first output data and the second cross-comparison data is a second error detection code based on the second output data, and wherein in response to the comparison further comprises: when the first cross-comparison data and the second cross-comparison data are not equal, the first cross-comparison data and the second cross-comparison data indicate the error. In Example 56, the subject matter of Examples 1-55 includes, wherein the first output data from the second connection and second output data of the secondary device comprise commands for actuators.

Example 57 is at least one machine-readable medium including instructions that, when executed by processing circuitry, cause the processing circuitry to perform operations to implement of any of Examples 1-56. Example 58 is an apparatus comprising means to implement of any of Examples 1-56. Example 59 is a system to implement of any of Examples 1-56. Example 60 is a method to implement of any of Examples 1-56.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a system, the apparatus comprising:
a first die comprising:
first processing logic;
a first connection to second processing logic of a second die, the first connection coupled to the first processing logic;
a second connection to an input/output (I/O) channel, the second connection coupled to the first processing logic;
a memory coupled to the first processing logic;
the second die comprising:
second processing logic;
a third connection from a secondary device, wherein the secondary device is outside the system, and the third connection is coupled to the second processing logic;
a memory coupled to the second processing logic, wherein the second processing logic is configured to:
in response to receiving an indication of a first error from the first die, send a signal to stop first output data from the second connection;
in response to receiving an indication of a second error from the secondary device via the third connection, send a signal to stop second output data of the secondary device;
receive first cross-comparison data from the first die;
receive second cross-comparison data from the secondary device; and
in response to a comparison of first cross-comparison data with second cross-comparison data indicating a third error and not receiving the first error or the second error, send a signal to stop the first output data and the second output data.

2. The apparatus of claim 1, wherein the first cross-comparison data is based on first output data and second cross-comparison data is based on second output data.

3. The apparatus of claim 1, wherein the second processing logic is further configured to:
in response to a comparison of first cross-comparison data with second cross-comparison data indicating the third error and receiving the first error and the second error, send the signal to stop the first output data and the second output data.

4. The apparatus of claim 1, wherein the system further comprises a first power source, a first clock, and a first fuse, wherein the first power source, the first clock, and the first fuse are coupled to the first die; and a second power source, a second clock, and a second fuse, wherein the second power source, the second clock, and the second fuse are coupled to the second die.

5. The apparatus of claim 1, wherein the first processing logic is further configured to:
receive input data from external sensors via the second connection;
generate first output data based on the input; and
send the first output data via the second connection.

6. The apparatus of claim 5, wherein the first processing logic is further configured to:
generate the first comparison data based on the output data.

7. The apparatus of claim 1, wherein the system is a system on a chip (SoC).

8. The apparatus of claim 1, wherein the system further comprises:
a switch, the switch configured to receive the first output data from the first processing logic on a fourth connection and the second output data from the secondary device on a fifth connection and to output third output data on a sixth connection, wherein the switch is configured to receive signals from the second processing logic on a seventh connection.

9. The apparatus of claim 8, wherein the switch is further configured to:
select among three configurations based on the signals from the second processing logic and the secondary device, the three configurations comprising: sending the first output data on the sixth connection, sending the second output data on the sixth connection, and stop the sixth connection.

10. The apparatus of claim 1, wherein the first die further comprises:
third processing logic to detect errors within the first die, wherein the third processing logic is configured to send an indication of errors within the first die to the first processing logic or the second processing logic.

11. The apparatus of claim 1, wherein the second die further comprises:
fourth processing logic to detect errors within the second die, wherein the fourth processing logic is configured to send an indication of errors with the second die to the second processing logic; and, wherein the second processing logic is further configured to:
in response to an indication of errors within the second die, send the signal to stop the first output data and the second output data.

12. The apparatus of claim 1, wherein the second connection is configured to connect to the second die, and wherein the second die further comprises an I/O interface, the I/O interface comprising I/O pins for receiving and sending data to an external device, wherein the second connection is connected to the I/O interface.

13. The apparatus of claim 1, wherein the second connection is configured to receive input from sensors and the first output data comprises data to control actuators, and wherein the third connection is configured to receive the input from the sensors and the second output data comprises the data to control actuators.

14. The apparatus of claim 1, wherein the first processing logic is configured to concurrently and redundantly implement a same application as the secondary device.

15. The apparatus of claim 1, wherein the first processing logic is further configured to:
receive second error from the secondary device and send the second error to the second die.

16. The apparatus of claim 1, wherein the processing logic is further configured to:
receive second comparison data from the secondary device and send the second comparison data to the second processing logic.

17. The apparatus of claim 1, wherein the system is an integrated circuit, and the first die and the second die are part of the integrated circuit.

18. The apparatus of claim 1, wherein the first cross-comparison data is a first error detection code based on the first output data and the second cross-comparison data is a second error detection code based on the second output data, and wherein to the comparison of the first cross-comparison data with the second cross-comparison data indicates the third error when the first cross-comparison data and the second cross-comparison data are not equal.

19. The apparatus of claim 1, wherein the first output data from the second connection and second output data of the secondary device comprise commands for actuators.

20. At least one non-transitory machine-readable storage medium including instructions for hardware fault tolerance, which when executed by second processing logic of a second die of a system, cause the second processing logic to perform operations comprising:
in response to receiving an indication of a first error from a first die of the system, sending a signal to stop first output data from a first processing logic, wherein the first die comprises the first processing logic;
in response to receiving an indication of a second error from a secondary device, the secondary device outside the system, sending a signal to stop second output data of the secondary device;
receiving first cross-comparison data from the first die;
receiving second cross-comparison data from the secondary device; and
in response to a comparison of first cross-comparison data with second cross-comparison data indicating a third error and not receiving the first error or the second error, sending a signal to stop the first output data and the second output data, wherein the first processing logic, the second processing logic, and the secondary system each operate based on separate clocks and wherein a first chip comprises the first die and the second die and a second chip comprises the secondary system.

21. The at least one non-transitory machine-readable storage medium of claim 20, wherein the first cross-comparison data is based on first output data and second cross-comparison data is based on second output data.

22. The at least one non-transitory machine-readable storage of claim 20, wherein the operations further comprise:
in response to a comparison of first cross-comparison data with second cross-comparison data indicating the third error and receiving the first error and the second error, sending the signal to stop the first output data and the second output.

23. A method for hardware fault tolerance performed by second processing logic of a second die of a system, the method comprising:
in response to receiving an indication of a first error from a first die of the system, sending a signal to stop first output data from a first processing logic, wherein the first die comprises the first processing logic;
in response to receiving an indication of a second error from a secondary device, the secondary device outside the system, sending a signal to stop second output data of the secondary device;
receiving first cross-comparison data from the first die;
receiving second cross-comparison data from the secondary device; and
in response to a comparison of first cross-comparison data with second cross-comparison data indicating a third error and not receiving the first error or the second error, sending a signal to stop the first output data and the second output data, wherein the first processing logic, the second processing logic, and the secondary system each operate based on separate clocks, and wherein a first chip comprises the first die and the second die and a second chip comprises the secondary system.

24. The method of claim 23, wherein the first cross-comparison data is based on first output data and second cross-comparison data is based on second output data.

25. The method of claim 23, wherein the method further comprise:
in response to a comparison of first cross-comparison data with second cross-comparison data indicating the third error and receiving the first error and the second error, sending the signal to stop the first output data and the second output data.

\* \* \* \* \*